US012664546B2

(12) United States Patent
Aaron

(10) Patent No.: US 12,664,546 B2
(45) Date of Patent: *Jun. 23, 2026

(54) AUTHORIZING A PURCHASE TRANSACTION USING A MOBILE DEVICE

(71) Applicant: Block, Inc., Oakland, CA (US)

(72) Inventor: Paul Aaron, San Francisco, CA (US)

(73) Assignee: Block, Inc., Oakland, CA (US)

( * ) Notice: Subject to any disclaimer, the term of this patent is extended or adjusted under 35 U.S.C. 154(b) by 1390 days.

This patent is subject to a terminal disclaimer.

(21) Appl. No.: 16/535,792

(22) Filed: Aug. 8, 2019

(65) Prior Publication Data

US 2022/0237602 A1     Jul. 28, 2022

Related U.S. Application Data

(63) Continuation of application No. 14/165,256, filed on Jan. 27, 2014, now Pat. No. 10,417,635.

(Continued)

(51) Int. Cl.
  *G06Q 20/40*        (2012.01)
  *G06Q 20/32*        (2012.01)
(52) U.S. Cl.
  CPC ........... *G06Q 20/40* (2013.01); *G06Q 20/322* (2013.01); *G06Q 20/326* (2020.05)
(58) Field of Classification Search
  CPC ........ G06Q 40/00; G06Q 40/02; G06Q 40/04; G06Q 40/025; G06Q 20/10; G06Q 20/102; G06Q 20/40; G06Q 20/322; G06Q 20/326

(Continued)

(56) References Cited

U.S. PATENT DOCUMENTS

| 5,276,311 A | 1/1994 | Hennige |
| 5,315,093 A | 5/1994 | Stewart |

(Continued)

FOREIGN PATENT DOCUMENTS

| AU | 2017235924 A1 | 10/2017 |
| AU | 2018205104 A1 | 7/2018 |

(Continued)

OTHER PUBLICATIONS

Notice of Allowance mailed Dec. 12, 2019, for U.S. Appl. No. 14/149,754, of Spindel, N., et al., filed Jan. 7, 2014.

(Continued)

*Primary Examiner* — Hani M Kazimi
(74) *Attorney, Agent, or Firm* — Polsinelli PC—Block, Inc

(57) ABSTRACT

Systems and methods for transaction facilitation are disclosed. The method includes receiving a request to initiate a payment transaction at a payment terminal of a seller, the request including a reference to a payment card associated with payment accounts of a user. In response to the request, a computer system queries a database for an identifier associated with the payment card and transmits a selection message to a mobile device based on the identifier. The selection message triggers an application executing at the mobile device to display a selection interface presenting the payment accounts, each associated with a respective interactive element, and a feedback interactive element enabling the user to provide feedback associated with the payment transaction. The computer system receives a selection of a payment account and feedback from the application, and facilitates the payment transaction based on the selected payment account and the feedback.

20 Claims, 14 Drawing Sheets

Related U.S. Application Data

(60) Provisional application No. 61/894,322, filed on Oct. 22, 2013.

(58) Field of Classification Search
USPC .................................................. 705/39, 42–44
See application file for complete search history.

(56) References Cited

U.S. PATENT DOCUMENTS

| | | | |
|---|---|---|---|
| 5,530,232 A | 6/1996 | Taylor | |
| 5,585,787 A | 12/1996 | Wallerstein | |
| 5,649,115 A | 7/1997 | Schrader | |
| 5,878,337 A | 3/1999 | Joao et al. | |
| 6,026,387 A | 2/2000 | Kesel | |
| 6,076,079 A | 6/2000 | Boston et al. | |
| 6,175,922 B1 | 1/2001 | Wang | |
| 6,378,075 B1 | 4/2002 | Goldstein et al. | |
| 6,422,462 B1 | 7/2002 | Cohen | |
| 6,427,911 B1 | 8/2002 | Barnes et al. | |
| 6,636,835 B2 | 10/2003 | Ragsdale-Elliott et al. | |
| 6,764,005 B2 | 7/2004 | Cooper | |
| 6,898,598 B2 | 5/2005 | Himmel et al. | |
| 7,010,495 B1 | 3/2006 | Samra et al. | |
| 7,136,448 B1 | 11/2006 | Venkataperumal et al. | |
| 7,353,203 B1 | 4/2008 | Kriplani et al. | |
| 7,406,436 B1 | 7/2008 | Reisman | |
| 7,764,185 B1 | 7/2010 | Manz et al. | |
| D621,849 S | 8/2010 | Anzures et al. | |
| 7,805,378 B2 | 9/2010 | Berardi et al. | |
| 8,060,259 B2 | 11/2011 | Budhraja et al. | |
| 8,190,514 B2 | 5/2012 | Bishop et al. | |
| 8,280,793 B1 | 10/2012 | Kempkes et al. | |
| 8,359,239 B1 | 1/2013 | Cook et al. | |
| 8,401,710 B2 | 3/2013 | Budhraja et al. | |
| D683,755 S | 6/2013 | Phelan | |
| 8,459,544 B2 | 6/2013 | Casey et al. | |
| 8,498,900 B1 | 7/2013 | Spirin et al. | |
| 8,548,929 B1 | 10/2013 | Goodwin et al. | |
| 8,571,916 B1 | 10/2013 | Bruce et al. | |
| 8,577,731 B1 | 11/2013 | Cope et al. | |
| 8,577,803 B2 * | 11/2013 | Chatterjee ............ | G06Q 20/326 |
| | | | 705/41 |
| 8,594,567 B2 | 11/2013 | Finkenzeller et al. | |
| D695,306 S | 12/2013 | Gabouer et al. | |
| 8,602,296 B1 * | 12/2013 | Velline .................. | G07F 19/202 |
| | | | 235/379 |
| 8,645,014 B1 | 2/2014 | Kozlowski et al. | |
| 8,682,806 B1 | 3/2014 | Cate et al. | |
| 8,694,357 B2 | 4/2014 | Ting et al. | |
| 8,712,854 B1 | 4/2014 | Rafferty et al. | |
| 8,732,085 B2 | 5/2014 | Bennett | |
| 8,843,385 B2 | 9/2014 | Jurca et al. | |
| D720,765 S | 1/2015 | Xie et al. | |
| D720,766 S | 1/2015 | Mandal et al. | |
| 8,949,142 B1 | 2/2015 | Angrish et al. | |
| D725,133 S | 3/2015 | Smirin et al. | |
| D725,666 S | 3/2015 | Tseng et al. | |
| 8,972,298 B2 | 3/2015 | Kunz et al. | |
| D732,059 S | 6/2015 | Andersen et al. | |
| 9,053,481 B2 | 6/2015 | Parento et al. | |
| 9,092,767 B1 | 7/2015 | Andrews et al. | |
| 9,092,776 B2 | 7/2015 | Dessert | |
| 9,092,828 B2 | 7/2015 | Hosp | |
| 9,183,480 B1 | 11/2015 | Quigley et al. | |
| 9,224,141 B1 | 12/2015 | Lamba et al. | |
| D748,114 S | 1/2016 | Leyon et al. | |
| D752,604 S | 3/2016 | Zhang | |
| D752,605 S | 3/2016 | Wang | |
| 9,384,497 B2 | 7/2016 | Calman et al. | |
| 9,542,681 B1 | 1/2017 | Borovsky et al. | |
| 9,619,792 B1 | 4/2017 | Aaron et al. | |
| D786,906 S | 5/2017 | Andersen et al. | |
| 9,652,751 B2 | 5/2017 | Aaron et al. | |
| 9,704,146 B1 | 7/2017 | Morgan et al. | |
| 9,727,912 B1 | 8/2017 | Poursartip et al. | |

| | | |
|---|---|---|
| 9,799,021 B1 | 10/2017 | Lee |
| 9,824,394 B1 | 11/2017 | Boates et al. |
| 9,836,739 B1 | 12/2017 | Borovsky et al. |
| 9,864,986 B1 | 1/2018 | White et al. |
| 9,875,469 B1 | 1/2018 | Chin et al. |
| 9,881,305 B1 | 1/2018 | Lewis et al. |
| 9,892,357 B2 | 2/2018 | Olson et al. |
| 9,922,321 B2 | 3/2018 | Aaron et al. |
| 9,978,099 B2 | 5/2018 | Rephlo et al. |
| 10,026,062 B1 | 7/2018 | Sasmaz et al. |
| 10,217,092 B1 | 2/2019 | Maxwell et al. |
| 10,313,480 B2 | 6/2019 | Greene et al. |
| 10,387,882 B2 | 8/2019 | Hagen et al. |
| 10,417,635 B1 | 9/2019 | Aaron |
| 10,430,797 B1 | 10/2019 | Borovsky et al. |
| 10,535,054 B1 | 1/2020 | Spitzer et al. |
| 10,607,199 B2 | 3/2020 | Cassel et al. |
| 10,621,563 B1 | 4/2020 | Spindel et al. |
| 10,650,440 B1 | 5/2020 | Yee et al. |
| 10,692,072 B1 | 6/2020 | Borovsky et al. |
| 10,726,399 B2 | 7/2020 | Aaron et al. |
| 10,789,585 B2 | 9/2020 | Sanchez et al. |
| 10,885,515 B1 | 1/2021 | Borovsky et al. |
| 11,810,078 B2 | 11/2023 | Maxwell et al. |
| 2001/0054003 A1 | 12/2001 | Chien et al. |
| 2002/0023027 A1 | 2/2002 | Simonds |
| 2003/0033272 A1 | 2/2003 | Himmel et al. |
| 2003/0204447 A1 | 10/2003 | Dalzell et al. |
| 2004/0103065 A1 | 5/2004 | Kishen et al. |
| 2004/0138999 A1 | 7/2004 | Friedman et al. |
| 2004/0197489 A1 | 10/2004 | Heuser et al. |
| 2004/0249746 A1 | 12/2004 | Horowitz et al. |
| 2005/0096853 A1 | 5/2005 | Hansen |
| 2005/0246245 A1 | 11/2005 | Satchell et al. |
| 2006/0032906 A1 | 2/2006 | Sines |
| 2006/0131385 A1 | 6/2006 | Kim |
| 2006/0146839 A1 | 7/2006 | Hurwitz et al. |
| 2006/0206488 A1 | 9/2006 | Distasio |
| 2006/0229896 A1 | 10/2006 | Rosen et al. |
| 2007/0150387 A1 | 6/2007 | Seubert et al. |
| 2007/0244766 A1 | 10/2007 | Goel |
| 2007/0255653 A1 | 11/2007 | Tumminaro et al. |
| 2007/0255662 A1 | 11/2007 | Tumminaro |
| 2008/0052176 A1 | 2/2008 | Buchheit |
| 2008/0077506 A1 | 3/2008 | Ram pell et al. |
| 2008/0078831 A1 | 4/2008 | Johnson et al. |
| 2008/0177624 A9 | 7/2008 | Dohse |
| 2008/0177826 A1 | 7/2008 | Pitroda |
| 2008/0197188 A1 | 8/2008 | Jagatic et al. |
| 2008/0197201 A1 | 8/2008 | Manessis et al. |
| 2008/0222047 A1 | 9/2008 | Boalt |
| 2008/0270246 A1 | 10/2008 | Chen |
| 2009/0033980 A1 | 2/2009 | Morris et al. |
| 2009/0043702 A1 | 2/2009 | Bennett |
| 2009/0063312 A1 | 3/2009 | Hurst |
| 2009/0094126 A1 | 4/2009 | Killian et al. |
| 2009/0099961 A1 | 4/2009 | Ogilvy |
| 2009/0106105 A1 | 4/2009 | Lewis et al. |
| 2009/0119190 A1 | 5/2009 | Realini |
| 2009/0171843 A1 | 7/2009 | Lee et al. |
| 2009/0204472 A1 | 8/2009 | Einhorn |
| 2009/0240558 A1 | 9/2009 | Bandy et al. |
| 2009/0266884 A1 | 10/2009 | Killian et al. |
| 2009/0288012 A1 | 11/2009 | Hertel et al. |
| 2009/0319638 A1 | 12/2009 | Faith et al. |
| 2010/0010906 A1 | 1/2010 | Grecia |
| 2010/0125495 A1 | 5/2010 | Smith et al. |
| 2010/0185514 A1 | 7/2010 | Glazer et al. |
| 2010/0217674 A1 | 8/2010 | Kean |
| 2010/0217675 A1 | 8/2010 | Bookstaff |
| 2010/0217699 A1 | 8/2010 | Bookstaff |
| 2010/0269059 A1 | 10/2010 | Olthmer et al. |
| 2010/0280896 A1 | 11/2010 | Postrel |
| 2010/0306099 A1 | 12/2010 | Hirson et al. |
| 2010/0325048 A1 | 12/2010 | Carlson et al. |
| 2010/0332265 A1 | 12/2010 | Smith |
| 2011/0029416 A1 | 2/2011 | Greenspan |
| 2011/0035319 A1 | 2/2011 | Brand et al. |
| 2011/0071892 A1 | 3/2011 | Dickelman |

(56)     References Cited

U.S. PATENT DOCUMENTS

| | | | |
|---|---|---|---|
| 2011/0106659 A1 | 5/2011 | Faith et al. | |
| 2011/0112897 A1 | 5/2011 | Tietzen et al. | |
| 2011/0125633 A1 | 5/2011 | Aaltonen et al. | |
| 2011/0145049 A1 | 6/2011 | Hertel et al. | |
| 2011/0145148 A1 | 6/2011 | Hammad | |
| 2011/0153438 A1 | 6/2011 | Dragt | |
| 2011/0166931 A1 | 7/2011 | Joa et al. | |
| 2011/0178883 A1* | 7/2011 | Granbery | G06Q 20/40 |
| | | | 705/16 |
| 2011/0180598 A1 | 7/2011 | Morgan et al. | |
| 2011/0196802 A1 | 8/2011 | Ellis et al. | |
| 2011/0218871 A1 | 9/2011 | Singh | |
| 2011/0231270 A1 | 9/2011 | Dykes et al. | |
| 2011/0246284 A1 | 10/2011 | Chaikin et al. | |
| 2011/0251962 A1 | 10/2011 | Hruska | |
| 2011/0276418 A1 | 11/2011 | Velani | |
| 2011/0295722 A1 | 12/2011 | Reisman | |
| 2011/0313871 A1 | 12/2011 | Greenwood | |
| 2012/0005076 A1 | 1/2012 | Dessert et al. | |
| 2012/0011062 A1 | 1/2012 | Baker et al. | |
| 2012/0066065 A1 | 3/2012 | Switzer | |
| 2012/0084210 A1* | 4/2012 | Farahmand | G06Q 40/02 |
| | | | 705/64 |
| 2012/0109693 A1 | 5/2012 | Smith | |
| 2012/0130785 A1 | 5/2012 | Postrel | |
| 2012/0136731 A1 | 5/2012 | Kidron et al. | |
| 2012/0143772 A1 | 6/2012 | Abadir | |
| 2012/0150643 A1 | 6/2012 | Wolfe et al. | |
| 2012/0166311 A1 | 6/2012 | Dwight et al. | |
| 2012/0166331 A1 | 6/2012 | Varsavsky Waisman-Diamond | |
| 2012/0185355 A1 | 7/2012 | Kilroy | |
| 2012/0191565 A1 | 7/2012 | Blank et al. | |
| 2012/0197740 A1 | 8/2012 | Grigg et al. | |
| 2012/0197743 A1 | 8/2012 | Grigg et al. | |
| 2012/0197794 A1 | 8/2012 | Grigg et al. | |
| 2012/0198279 A1 | 8/2012 | Schroeder | |
| 2012/0209749 A1 | 8/2012 | Hammad et al. | |
| 2012/0214416 A1 | 8/2012 | Kent et al. | |
| 2012/0221446 A1 | 8/2012 | Grigg et al. | |
| 2012/0253852 A1 | 10/2012 | Pourfallah et al. | |
| 2012/0254031 A1* | 10/2012 | Walker | G06Q 20/409 |
| | | | 705/42 |
| 2012/0271707 A1 | 10/2012 | Harrison et al. | |
| 2012/0290484 A1 | 11/2012 | Maher | |
| 2012/0296726 A1 | 11/2012 | Dessert et al. | |
| 2012/0310760 A1 | 12/2012 | Phillips et al. | |
| 2012/0316941 A1 | 12/2012 | Moshfeghi | |
| 2013/0019284 A1 | 1/2013 | Pacyga et al. | |
| 2013/0024307 A1 | 1/2013 | Fuerstenberg et al. | |
| 2013/0030879 A1 | 1/2013 | Munjal | |
| 2013/0030997 A1 | 1/2013 | Spodak et al. | |
| 2013/0036065 A1 | 2/2013 | Chen et al. | |
| 2013/0041824 A1 | 2/2013 | Gupta | |
| 2013/0046643 A1 | 2/2013 | Wall et al. | |
| 2013/0054320 A1 | 2/2013 | Dorso et al. | |
| 2013/0112743 A1 | 5/2013 | Cavin et al. | |
| 2013/0124361 A1 | 5/2013 | Bryson | |
| 2013/0132182 A1 | 5/2013 | Fung et al. | |
| 2013/0134216 A1 | 5/2013 | Spodak et al. | |
| 2013/0138563 A1 | 5/2013 | Gilder et al. | |
| 2013/0144707 A1 | 6/2013 | Issacson et al. | |
| 2013/0159081 A1 | 6/2013 | Shastry et al. | |
| 2013/0159173 A1 | 6/2013 | Sivaraman et al. | |
| 2013/0166402 A1 | 6/2013 | Parento et al. | |
| 2013/0166445 A1 | 6/2013 | Issacson et al. | |
| 2013/0173407 A1 | 7/2013 | Killian et al. | |
| 2013/0181045 A1 | 7/2013 | Dessert et al. | |
| 2013/0191194 A1 | 7/2013 | Shreibati et al. | |
| 2013/0202185 A1 | 8/2013 | Irwin et al. | |
| 2013/0204727 A1* | 8/2013 | Rothschild | G06Q 30/014 |
| | | | 705/21 |
| 2013/0218697 A1 | 8/2013 | Kingston et al. | |
| 2013/0218721 A1 | 8/2013 | Borhan et al. | |
| 2013/0246203 A1 | 9/2013 | Laracey | |
| 2013/0246218 A1 | 9/2013 | Gopalan | |
| 2013/0254051 A1 | 9/2013 | Kim et al. | |
| 2013/0295882 A1 | 11/2013 | Zhao | |
| 2013/0317835 A1 | 11/2013 | Mathew | |
| 2013/0317886 A1 | 11/2013 | Kiran et al. | |
| 2013/0332354 A1 | 12/2013 | Rhee et al. | |
| 2013/0339253 A1 | 12/2013 | Sincai | |
| 2013/0346223 A1* | 12/2013 | Prabhu | G06Q 20/3223 |
| | | | 705/17 |
| 2013/0346302 A1 | 12/2013 | Purves et al. | |
| 2014/0006205 A1 | 1/2014 | Berry et al. | |
| 2014/0012754 A1* | 1/2014 | Hanson | G06Q 20/042 |
| | | | 705/44 |
| 2014/0025515 A1 | 1/2014 | Argue et al. | |
| 2014/0032297 A1 | 1/2014 | Germann et al. | |
| 2014/0040052 A1 | 2/2014 | Arthur et al. | |
| 2014/0052484 A1 | 2/2014 | Bellamy | |
| 2014/0052613 A1 | 2/2014 | Tavakoli et al. | |
| 2014/0052617 A1 | 2/2014 | Chawla et al. | |
| 2014/0059466 A1 | 2/2014 | Mairs et al. | |
| 2014/0067557 A1 | 3/2014 | van Niekerk et al. | |
| 2014/0074569 A1 | 3/2014 | Francis et al. | |
| 2014/0074631 A1 | 3/2014 | Grossman et al. | |
| 2014/0074658 A1 | 3/2014 | Sanchez | |
| 2014/0074675 A1 | 3/2014 | Calman et al. | |
| 2014/0074691 A1 | 3/2014 | Bank et al. | |
| 2014/0081783 A1 | 3/2014 | Paranjape et al. | |
| 2014/0081853 A1 | 3/2014 | Sanchez et al. | |
| 2014/0081854 A1 | 3/2014 | Sanchez et al. | |
| 2014/0089073 A1 | 3/2014 | Jacobs et al. | |
| 2014/0089078 A1 | 3/2014 | Dessert et al. | |
| 2014/0100931 A1 | 4/2014 | Sanchez et al. | |
| 2014/0100973 A1 | 4/2014 | Brown et al. | |
| 2014/0100991 A1 | 4/2014 | Lenahan et al. | |
| 2014/0101737 A1 | 4/2014 | Rhee | |
| 2014/0114775 A1 | 4/2014 | Cloin et al. | |
| 2014/0129942 A1 | 5/2014 | Rathod | |
| 2014/0136349 A1 | 5/2014 | Dave et al. | |
| 2014/0143157 A1 | 5/2014 | Jeffs et al. | |
| 2014/0149239 A1 | 5/2014 | Argue et al. | |
| 2014/0156508 A1 | 6/2014 | Argue et al. | |
| 2014/0156517 A1 | 6/2014 | Argue et al. | |
| 2014/0164234 A1 | 6/2014 | Coffman et al. | |
| 2014/0172558 A1 | 6/2014 | Harris | |
| 2014/0201067 A1 | 7/2014 | Lai et al. | |
| 2014/0207680 A1 | 7/2014 | Rephlo | |
| 2014/0214652 A1 | 7/2014 | Zheng et al. | |
| 2014/0244462 A1 | 8/2014 | Maenpaa et al. | |
| 2014/0244489 A1 | 8/2014 | Kessler et al. | |
| 2014/0249947 A1* | 9/2014 | Hicks | G06Q 10/087 |
| | | | 705/21 |
| 2014/0250002 A1 | 9/2014 | Issacson et al. | |
| 2014/0279098 A1 | 9/2014 | Ham | |
| 2014/0344102 A1 | 11/2014 | Cooper | |
| 2014/0351004 A1 | 11/2014 | Flett | |
| 2014/0372300 A1 | 12/2014 | Blythe | |
| 2014/0379536 A1 | 12/2014 | Varma et al. | |
| 2014/0379580 A1 | 12/2014 | Varma et al. | |
| 2015/0012426 A1 | 1/2015 | Purves et al. | |
| 2015/0032567 A1 | 1/2015 | Bhatia | |
| 2015/0066699 A1 | 3/2015 | Fisher | |
| 2015/0066765 A1 | 3/2015 | Banks et al. | |
| 2015/0073907 A1 | 3/2015 | Purves et al. | |
| 2015/0073989 A1 | 3/2015 | Green et al. | |
| 2015/0095134 A1 | 4/2015 | Parker et al. | |
| 2015/0095228 A1 | 4/2015 | Su et al. | |
| 2015/0100481 A1 | 4/2015 | Ghosh et al. | |
| 2015/0120418 A1 | 4/2015 | Cervenka et al. | |
| 2015/0127553 A1 | 5/2015 | Sundaram et al. | |
| 2015/0134439 A1 | 5/2015 | Maxwell et al. | |
| 2015/0134528 A1 | 5/2015 | Fineman et al. | |
| 2015/0142514 A1 | 5/2015 | Tutte | |
| 2015/0142594 A1 | 5/2015 | Lutnick et al. | |
| 2015/0178712 A1 | 6/2015 | Angrish et al. | |
| 2015/0178755 A1 | 6/2015 | Barroso | |
| 2015/0186885 A1 | 7/2015 | Agrawal et al. | |
| 2015/0187021 A1 | 7/2015 | Moring et al. | |
| 2015/0194023 A1 | 7/2015 | Brackenridge et al. | |
| 2015/0304270 A1 | 10/2015 | Cook | |
| 2015/0324901 A1 | 11/2015 | Starikova et al. | |

(56) References Cited

U.S. PATENT DOCUMENTS

| | | |
|---|---|---|
| 2015/0332223 A1 | 11/2015 | Aaron et al. |
| 2015/0332237 A1 | 11/2015 | Aaron et al. |
| 2016/0012465 A1 | 1/2016 | Sharp |
| 2016/0019614 A1 | 1/2016 | Dziuk |
| 2016/0092874 A1 | 3/2016 | O'regan et al. |
| 2016/0203506 A1 | 7/2016 | Butler et al. |
| 2016/0232527 A1 | 8/2016 | Patterson |
| 2016/0321663 A1 | 11/2016 | Battle |
| 2016/0328698 A1 | 11/2016 | Kumaraguruparan et al. |
| 2018/0032997 A1 | 2/2018 | Gordon et al. |
| 2018/0150807 A1 | 5/2018 | Aaron et al. |
| 2018/0181941 A1 | 6/2018 | Maxwell et al. |
| 2018/0268405 A1 | 9/2018 | Lopez |
| 2018/0300741 A1 | 10/2018 | Leonard et al. |
| 2019/0043039 A1 | 2/2019 | Wilson |
| 2020/0034801 A1 | 1/2020 | Maxwell et al. |
| 2020/0327509 A1 | 10/2020 | Aaron et al. |
| 2023/0016910 A1 | 1/2023 | Sasmaz et al. |
| 2023/0020714 A1 | 1/2023 | Aaron et al. |
| 2024/0020659 A1 | 1/2024 | Maxwell et al. |

FOREIGN PATENT DOCUMENTS

| | | |
|---|---|---|
| CA | 2916603 A1 | 12/2014 |
| EP | 1 107 198 A2 | 6/2001 |
| GB | 2530451 A | 3/2016 |
| WO | 2009/111857 A1 | 9/2009 |
| WO | 2011/014875 A1 | 2/2011 |
| WO | 2014/210020 A1 | 12/2014 |
| WO | 2015/061005 A1 | 4/2015 |
| WO | 2015/069389 A1 | 5/2015 |
| WO | 2015/100378 A1 | 7/2015 |
| WO | 2015/179316 A1 | 11/2015 |

OTHER PUBLICATIONS

Notice of Allowance mailed Jan. 31, 2020, for U.S. Appl. No. 15/830,059, of Borovsky, A., et al., filed Dec. 4, 2017.

Non-Final Office Action mailed Feb. 6, 2020, for U.S. Appl. No. 15/900,433, of Rezayee, A., et al., filed Feb. 20, 2018.

Notice of Allowance mailed Feb. 20, 2020, for U.S. Appl. No. 14/208,800, of Thome, J.P., et al., filed Mar. 13, 2014.

"Advancing Payment Security: MasterCard Contactless Security Overview," www.mastercard.com, retrieved from Internet URL: https://www.mastercard.com/contactless/doc/MasterCardContactless_SecurityFactSheet_2015.pdf, on Jun. 12, 2017, pp. 1-4.

Berger, S., et al.,"Web services on mobile devices—Implementation and Experience," Computer Society, Proceedings of the Fifth IEEE Workshop on Mobile Computing Systems and Applications, pp. 1-10 (Oct. 2003 ).

Delic, N., et al., "Mobile Payment Solution—Symbiosis Between Banks, Application Service Providers and Mobile Network Operators," Computer Society, Proceedings of the Third International Conference on Information Technology: New Generations (ITNG'06), pp. 1-5 (Apr. 2006).

Munson, J., and Gupta, V.K., "Location-Based Notification as a General-Purpose Service," dated Sep. 28, 2002, Retrieved from the Internet URL—https://ai2-s2-pdfs.s3.amazonaws.com/1 bb5/6ae0a70b030e2f2376ed246834bddcabd27b.pdf, pp. 40-44.

Non-Final Office Action mailed Oct. 15, 2018, for U.S. Appl. No. 15/900,433, of Rezayee, A., filed Feb. 20, 2018.

Non-Final Office Action mailed Aug. 27, 2014, for U.S. Appl. No. 14/165,256, of Aaron, P., filed Jan. 27, 2014.

Non-Final Office Action mailed Jan. 2, 2015, for U.S. Appl. No. 14/271,379, of Lewis, J., et al., filed May 6, 2014.

Final Office Action mailed Mar. 17, 2015, for U.S. Appl. No. 14/165,256, of Aaron, P., filed Jan. 27, 2014.

Non-Final Office Action mailed Apr. 27, 2015, for U.S. Appl. No. 14/184,503 of Borovsky, A., et al., filed Feb. 19, 2014.

Final Office Action mailed Jun. 26, 2015, for U.S. Appl. No. 14/271,379, of Lewis, J., et al., filed May 6, 2014.

Non-Final Office Action mailed Jul. 2, 2015, for U.S. Appl. No. 14/208,800, of Thome, J.P., et al., filed Mar. 13, 2014.

Final Office Action mailed Sep. 21, 2015, for U.S. Appl. No. 14/184,503, of Borovsky, A., et al., filed Feb. 19, 2014.

Non-Final Office Action mailed Sep. 30, 2015, for U.S. Appl. No. 14/189,880, of Aaron, P., et al., filed Feb. 25, 2014.

Non-Final Office Action mailed Oct. 8, 2015, for U.S. Appl. No. 14/149,754, of Spindel, N., et al., filed Jan. 7, 2014.

Non-Final Office Action mailed Oct. 8, 2015, for U.S. Appl. No. 14/165,256, of Aaron, P., filed Jan. 27, 2014.

Advisory Action mailed Dec. 4, 2015, for U.S. Appl. No. 14/184,503, of Borovsky, A., et al., filed Feb. 19, 2014.

Final Office Action mailed Dec. 31, 2015, for U.S. Appl. No. 14/208,800, of Thome, J.P., et al., filed Mar. 13, 2014.

Non-Final Office Action mailed Mar. 31, 2016, for U.S. Appl. No. 14/271,379, of Lewis, J., et al., filed May 6, 2014.

Final Office Action mailed Apr. 13, 2016, for U.S. Appl. No. 14/165,256, of Aaron, P., filed Jan. 27, 2014.

Final Office Action mailed Apr. 28, 2016, for U.S. Appl. No. 14/189,880, of Aaron, P., et al., filed Feb. 25, 2014.

Non-Final Office Action mailed Jun. 7, 2016, for U.S. Appl. No. 14/208,800, of Thome, J.P., et al., filed Mar. 13, 2014.

Non-Final Office Action mailed Jun. 17, 2016, for U.S. Appl. No. 14/184,503, of Borovsky, A., et al., filed Feb. 19, 2014.

Final Office Action mailed Jun. 17, 2016, for U.S. Appl. No. 14/149,754, of Spindel, N., et al., filed Jan. 7, 2014.

Advisory Action mailed Sep. 21, 2016, for U.S. Appl. No. 14/149,754, of Spindel, N., et al., filed Jan. 7, 2014.

Non-Final Office Action mailed Sep. 21, 2016, for U.S. Appl. No. 14/189,880, of Aaron, P., et al., filed Feb. 25, 2014.

Final Office Action mailed Oct. 6, 2016, for U.S. Appl. No. 14/271,379, of Lewis, J., et al., filed May 6, 2014.

Final Office Action mailed Nov. 30, 2016, for U.S. Appl. No. 14/208,800, of Thome, J.P., et al., filed Mar. 13, 2014.

Final Office Action mailed Dec. 27, 2016, for U.S. Appl. No. 14/184,503, of Borovsky, A., et al., filed Feb. 19, 2014.

Advisory Action mailed Dec. 29, 2016, for U.S. Appl. No. 14/271,379, of Lewis, J., et al., filed May 6, 2014.

Non-Final Office Action mailed Jan. 20, 2017, for U.S. Appl. No. 14/168,274, of Odawa, A.W., et al., filed Jan. 30, 2014.

Final Office Action mailed Mar. 2, 2017, for U.S. Appl. No. 14/189,880, of Aaron, P., et al., filed Feb. 25, 2014.

Advisory Action mailed Mar. 9, 2017, for U.S. Appl. No. 14/184,503, of Borovsky, A., et al., filed Feb. 19, 2014.

Non-Final Office Action mailed Apr. 21, 2017, for U.S. Appl. No. 14/149,754, of Spindel, N., et al., filed Jan. 7, 2014.

Final Office Action mailed May 19, 2017, for U.S. Appl. No. 14/168,274, of Odawa, A.W., et al., filed Jan. 30, 2014.

Notice of Allowance mailed Jul. 6, 2017, for U.S. Appl. No. 14/184,503, of Borovsky, A., et al., filed Feb. 19, 2014.

Non-Final Office Action mailed Aug. 4, 2017, for U.S. Appl. No. 14/526,337, of Wolter, J.A., filed Oct. 28, 2014.

Notice of Allowance mailed Sep. 18, 2017, for U.S. Appl. No. 14/271,379, of Lewis, J., et al., filed May 6, 2014.

Final Office Action mailed Dec. 1, 2017, for U.S. Appl. No. 14/149,754, of Spindel, N., et al., filed Jan. 7, 2014.

Non-Final Office Action mailed Dec. 29, 2017, for U.S. Appl. No. 14/165,256, of Aaron, P., filed Jan. 27, 2014.

Final Office Action mailed Mar. 14, 2018, for U.S. Appl. No. 14/526,337, of Wolter, J.A., filed Oct. 28, 2014.

Advisory Action mailed Mar. 16, 2018, for U.S. Appl. No. 14/149,754, of Spindel, N., et al., filed Jan. 7, 2014.

Non-Final Office Action mailed May 17, 2018, for U.S. Appl. No. 14/149,754, of Spindel, N., et al., filed Jan. 7, 2014.

Non-Final Office Action mailed Jul. 6, 2018, for U.S. Appl. No. 14/526,337, of Wolter, J.A., filed Oct. 28, 2014.

Final Office Action mailed Jul. 27, 2018, for U.S. Appl. No. 14/165,256, of Aaron, P., filed Jan. 27, 2014.

Advisory Action mailed Oct. 4, 2018, for U.S. Appl. No. 14/165,256, of Aaron, P., filed Jan. 27, 2014.

Final Office Action mailed Dec. 31, 2018, for U.S. Appl. No. 14/149,754, of Spindel, N., et al., filed Jan. 7, 2014.

(56) References Cited

OTHER PUBLICATIONS

Final Office Action mailed Feb. 12, 2019, for U.S. Appl. No. 14/526,337, of Wolter, A., filed Oct. 28, 2014.
Advisory Action mailed Mar. 29, 2019, for U.S. Appl. No. 14/149,754, of Spindel, N., et al., filed Jan. 7, 2014.
Advisory Action mailed Apr. 25, 2019, for U.S. Appl. No. 14/526,337, of Wolter, J.A., filed Oct. 28, 2014.
Final Office Action mailed May 2, 2019, for U.S. Appl. No. 15/900,433, of Rezayee, A., et al., filed Feb. 20, 2018.
"Bluetooth Accessory Design Guidelines for Apple Products," "Apple Inc., dated Sep. 18, 2013, Retrieved fromhe Internet URL: https://developer.apple.com/hardwaredrivers/ BluetoothDesignGuidelines.pdf, pp. 1-40".
Bruene, J., "Capital One Add Rewards to Mobile App, Includes Ability to Redeem from Previous Travel," netbanker.com, published Apr. 20, 2012, Retrieved from the Internet URL: https://web.archive. org/web/20120425043052/http://www.netbanker.com/2012/04/capital_ one_add_rewards_to_mobile_app_includes_ability_to_redeem_for_ previous_travel.html, on Aug. 10, 2018, pp. 1-2.
Joy, "Square Wallet—an IOS App updated to send gift cards," Top Apps, dated Apr. 6, 2013, Retrieved from the Internet URL: http://www.topapps.net/apple-ios/square-wallet-an-ios-app-updated-to-send-gift-cards.html/, pp. 1-3.
Konrad, J., "A Traveler's Review of the Capital One Venture Rewards Card," Runaway truck, dated on Jul. 11, 2013, Retrieved from the Internet URL: http://web.archive.org/web/20130923122057/ http://queenofsubtle.com/rt/travel-tips/a-travelers-review-of-the-capital-one-venture-rewards-card, pp. 1-2.
Chiraag, "A payment Card that Changes Magnetic Stripe via Smartphone," published Nov. 12, 2013, Retrieved from the Internet URL: https://letstalkpayments.com/card-changes-magnetic-stripe-via-smartphone/, on Jan. 3, 2018, pp. 1-6.
Notice of Allowance mailed May 8, 2019, for U.S. Appl. No. 14/165,256, of Aaron, P., filed Jan. 27, 2014.
Non-Final Office Action mailed Jul. 11, 2019, for U.S. Appl. No. 14/149,754, of Spindel, N., et al., filed Jan. 7, 2014.
Non-Final Office Action mailed Aug. 14, 2019, for U.S. Appl. No. 15/830,059, of Borovsky, A., et al., filed Dec. 4, 2017
Notice of Allowance mailed Oct. 18, 2019, for U.S. Appl. No. 14/208,800, of Thome, J.P., et al., filed Mar. 13, 2014.

* cited by examiner

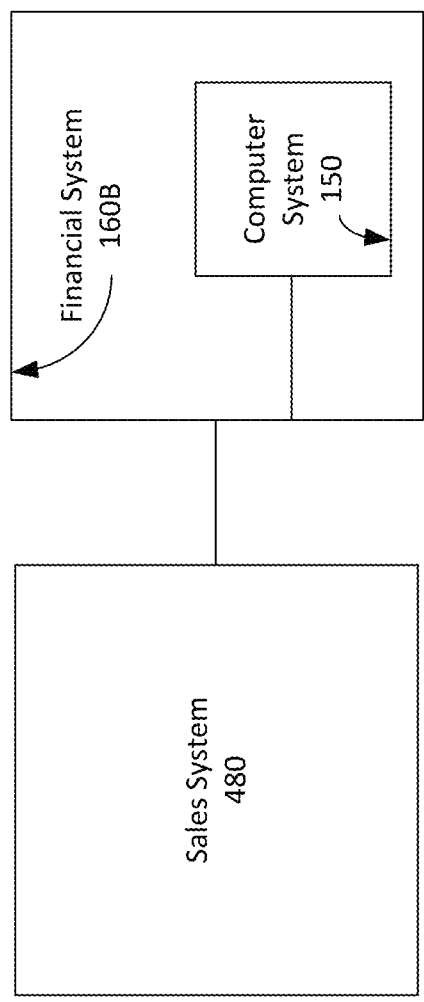
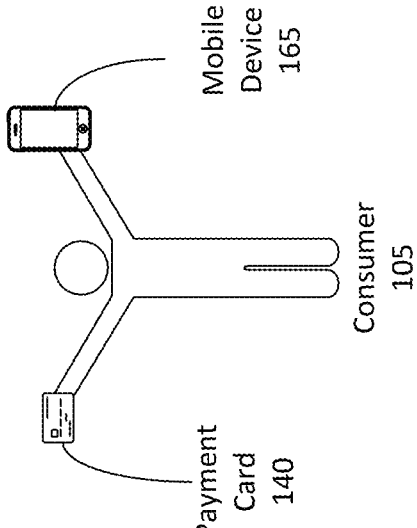
*FIG. 5*

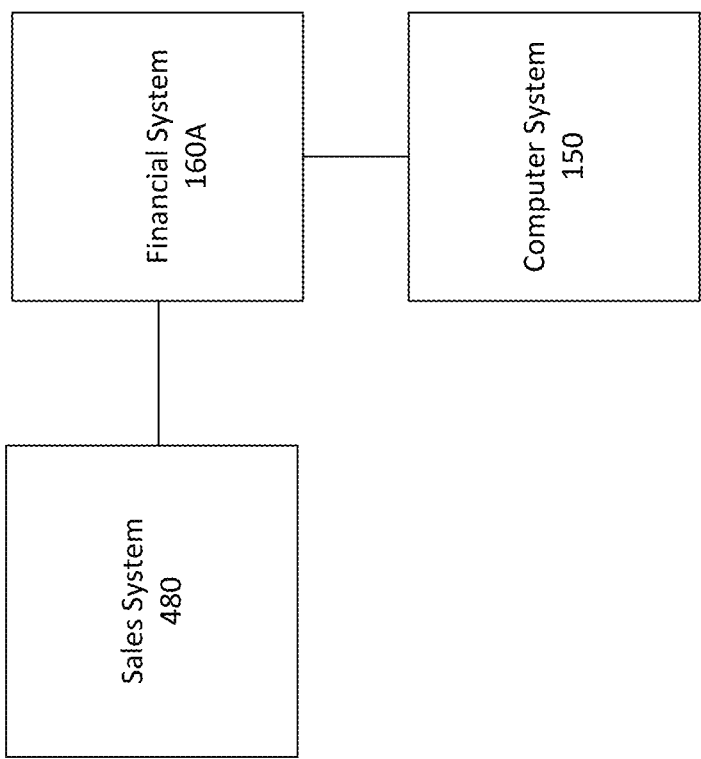
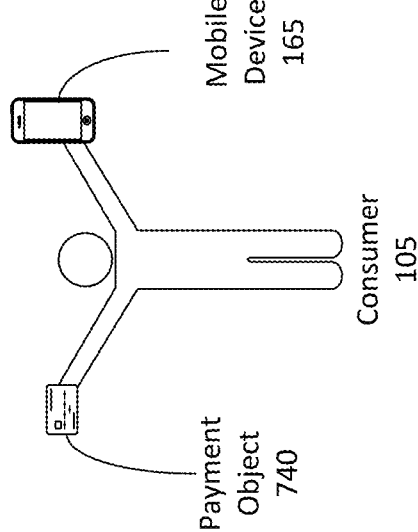
*FIG. 7*

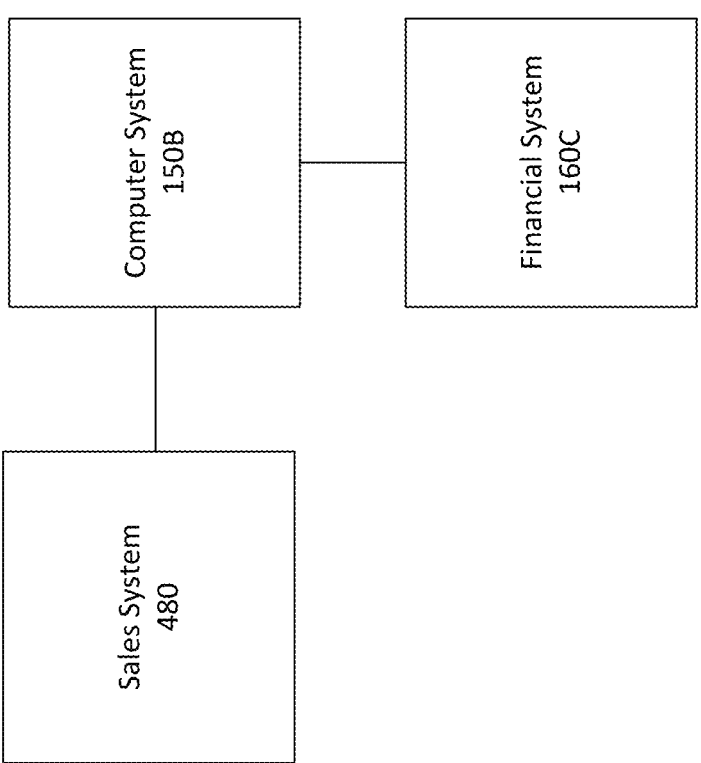
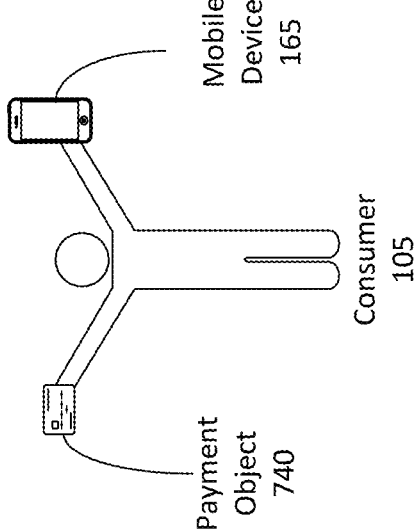
*FIG. 8*

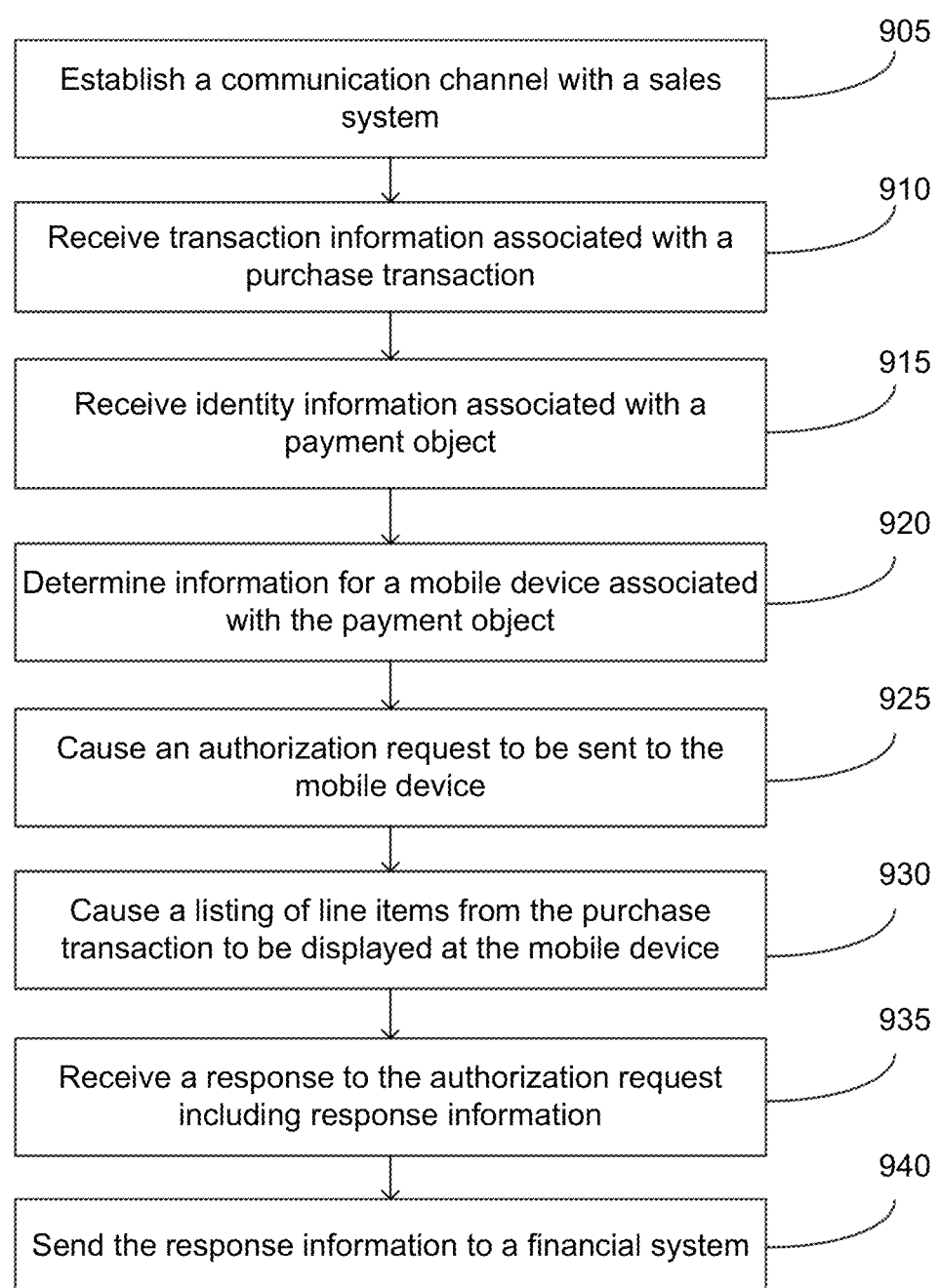

905

Establish a communication channel with a sales system

910

Receive transaction information associated with a purchase transaction

915

Receive identity information associated with a payment object

920

Determine information for a mobile device associated with the payment object

925

Cause an authorization request to be sent to the mobile device

930

Cause a listing of line items from the purchase transaction to be displayed at the mobile device

935

Receive a response to the authorization request including response information

940

Send the response information to a financial system

AUTHORIZING A PURCHASE TRANSACTION USING A MOBILE DEVICE

CROSS-REFERENCE TO RELATED APPLICATIONS

This application is a continuation of U.S. application Ser. No. 14/165,256 filed on Jan. 27, 2014 entitled "AUTHO-RIZING A PURCHASE TRANSACTION USING A MOBILE DEVICE", which claims the benefit of U.S. pro-visional patent application No. 61/894,322, filed Oct. 22, 2013, which are incorporated by reference herein in their entireties.

BACKGROUND

Consumers today use many types of payment cards and other payment mechanisms to make purchases, for example, using a credit card or automated teller machine (ATM) card to buy a coffee at a coffee shop. In a typical transaction, a consumer takes a payment card out of her wallet or purse and the payment card is slid through a card reader by the consumer or a sales clerk. In the case of a purchase using a credit card, the consumer may have to provide a signature. The consumer typically provides a signature that is captured electronically, such as by signing on a touch sensitive pad or screen provided by the seller, the touch sensitive pad or screen capturing the signature electronically. In the case of a purchase using an ATM card, the consumer may need to provide her personal identification number (PIN) for her card. The consumer typically enters her PIN using a keypad provided by the seller.

Some consumers are concerned with certain aspects of such purchase transactions. For example, a consumer may be concerned with touching items previously touched by other people, due to their concern or, in some cases, even fear of catching germs left on the items by other people. When providing her signature for a credit card transaction, a consumer may be concerned with germs left on the stylus or touch-sensitive pad or screen by a previous consumer when the previous consumer provides his signature. When providing her PIN number, a consumer may be concerned with catching germs left on the keypad or touch screen when a previous consumer uses the keypad or touch screen to provide his PIN.

Consumers may also be concerned with others obtaining information the consumer prefers to keep private during the transaction. For example, a consumer may be concerned about using the seller's keypad to enter the consumer's PIN, as the consumer may feel that she cannot adequately hide from others the PIN that she enters using that keypad.

BRIEF DESCRIPTION OF THE DRAWINGS

Embodiments of the present invention will be described and explained through the use of the accompanying draw-ings in which:

FIG. 5 is an illustration of components of or associated with a forth embodiment of a system for authorizing a purchase transaction using a mobile device;

FIG. 7 is an illustration of components of or associated with a fifth embodiment of a system for authorizing a purchase transaction using a mobile device;

FIG. 8 is an illustration of components of or associated with a sixth embodiment of a system for authorizing a purchase transaction using a mobile device;

FIG. 9 is a flow chart illustrating exemplary operations of a second embodiment of a method for authorizing a trans-action using a mobile device;

Figure 1:
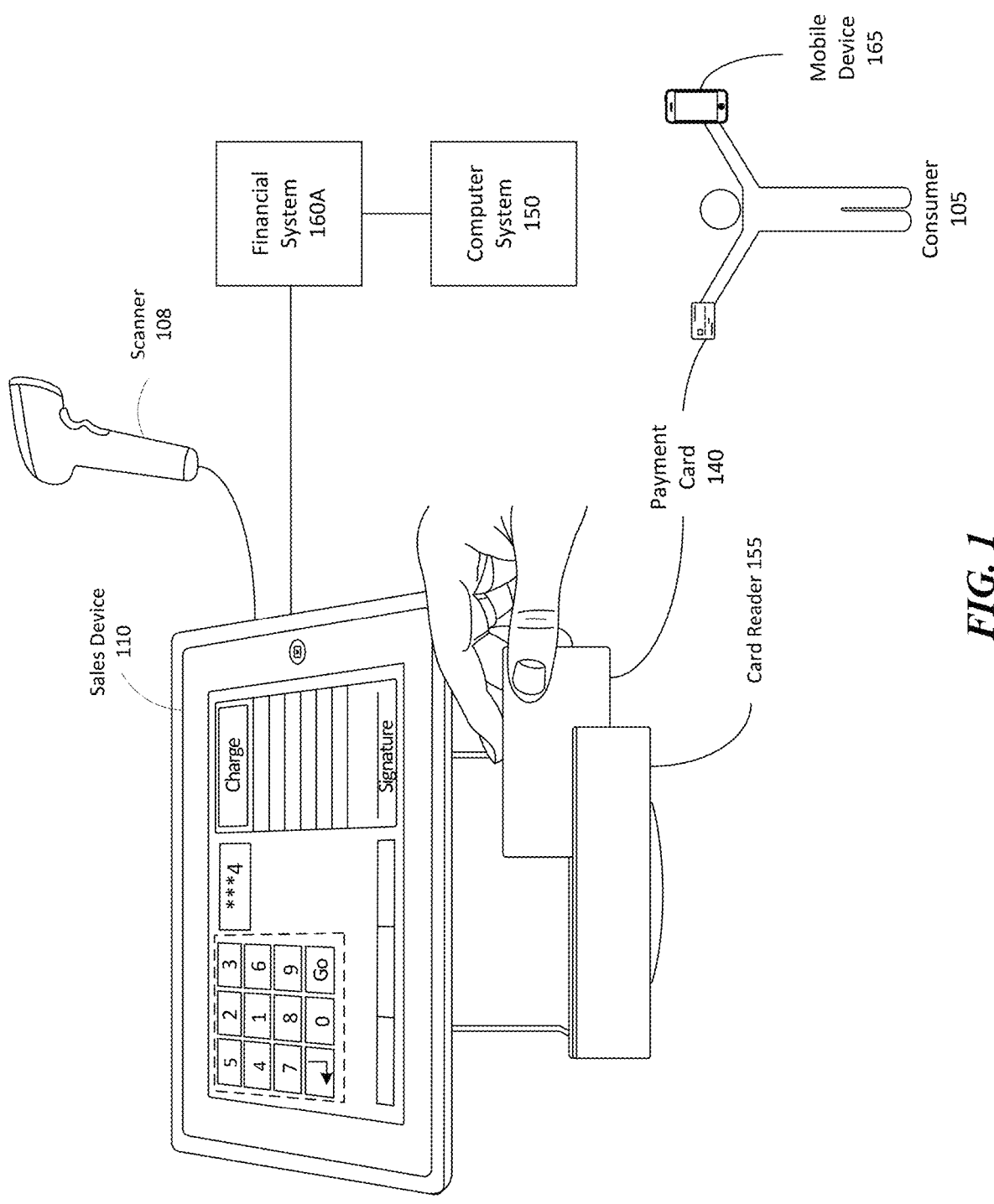
FIG. 1 is an illustration of components of or associated with a first embodiment of a system for authorizing a purchase transaction using a mobile device.

The drawings are not necessarily drawn to scale. For example, the dimensions of some of the elements in the figures may be expanded or reduced to help improve the understanding of the embodiments of the present invention. Similarly, some components and/or operations may be sepa-rated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

This application discloses technology related to process-ing a purchase transaction wherein a consumer can use a mobile device related to the purchase, for example, to authorize the purchase transaction, to review items associ-ated with the purchase transaction, or to select a payment account to use for a payment. As one example, a consumer can pay for a purchase using a credit card, automated teller machine (ATM) card, or proxy card, and the card can be swiped through a card reader that is part of the seller's point of sale system, a common example of a point of sale system being sales systems typically used by businesses like Wal-mart® and Target®. The term "swipe" here refers to any manner of triggering a physical card reader to read a physical card, such as passing a card through a magnetic stripe reader, smartcard reader, optical code reader, radio frequency identification (RFID) reader, etc. The term "sale", as in point-of-sale (POS) or sales system, refers to any type of payment-oriented transaction, including a lease or rental for example, and is not limited to an actual purchase. After a successful swipe, the process of authorizing the transaction begins. A consumer can use, for example, a smartphone instead of the seller's keypad or signature pad to electronically capture a signature or personal identification number (PIN) as part of the consumer's authorization of the purchase transaction. A consumer can use a mobile device, for example, to review line items of a purchase transaction. At a business where tips are appropriate, such as a restaurant, a consumer can, for example, use a mobile device such as a smartphone to add a tip amount to the purchase transaction. In an embodiment, a proxy card is a payment card that is associated with multiple electronic accounts via an association maintained at a server. When the consumer uses a proxy card to pay for the purchase, the consumer can use a mobile device to select an electronic account to use to pay for the purchase.

Some consumers are concerned with several aspects of making a purchase using a payment card such as a credit card or an ATM card. For example, when providing a signature for a credit card transaction, some consumers are concerned about catching germs left on the stylus or the touch-sensitive pad or screen by a previous consumer when the previous consumer provides a signature. Such consumers would appreciate being able to provide a signature without having to worry about catching germs from others. Some consumers are similarly concerned about catching germs left on the seller's keypad used by other consumer's when entering their PINs. Such consumers would similarly appreciate being able to provide their PIN without having to worry about catching germs from others. Further, some customers are concerned with security, for example, concerned that someone may see their PIN when they enter it using the seller's keypad.

As discussed above, this application discloses technology related to processing a purchase transaction wherein a consumer can use a mobile device related to the purchase, for example, to authorize the purchase transaction, to review items associated with the purchase transaction, or to select a payment account to use for a payment. A consumer can use a mobile device, such as a smartphone or tablet, to electronically capture the consumer's signature or PIN. This enables the consumer to avoid having to touch the seller's equipment. For example, the consumer does not have to touch the seller's stylus or touch-sensitive pad or screen to provide a signature, nor does the consumer have to touch the seller's keypad to enter her PIN. Further, the consumer can use her mobile device for other parts of the purchase transaction. For example, a bill for a meal at a restaurant can be displayed on the mobile device of a consumer, and the consumer can enter the amount she desires to leave as a tip using her mobile device with this amount being added to her bill. As another example, the bill for the meal can also be displayed at the line item level, and the consumer can check each line item of the bill to ensure that the bill is correct before using her mobile device to authorize the purchase transaction, for example, by providing her signature or PIN using her mobile device. As another example, the consumer can pay for the meal using a proxy card. The card is swiped through a card reader coupled to a point-of-sale (POS) system, and a listing of the payment account associated with the proxy card appears on the consumer's mobile device. The consumer uses the mobile device to select a payment card to use to pay for the meal.

Further, using a mobile device as part of authorizing a purchase transaction can increase the security of the transaction. For example, to use a mobile device as part of a purchase transaction authorization, the mobile device may need to be associated with a payment card such as a credit card. A transaction that involves both a credit card and a mobile phone, both of which are associated with a consumer, can be more secure than a purchase transaction involving only one item, such as only the credit card or only the mobile device.

Some restaurant owners may also appreciate certain aspects of the disclosed technology. For example, the process of collecting payment for a meal can be streamlined. A waiter can take a consumer's order using a restaurant mobile device, for example an iPad©, and can also read the consumer's payment card using, for example, a card reader coupled to the iPad©. The bill for the meal can be automatically generated and transmitted to the consumer's mobile device where the bill for the meal can be displayed on the screen. The consumer, at her leisure and even while at her table, can use her mobile device to review the bill at the line item level, can use her mobile device to add a tip, can use her mobile device to provide her signature or PIN number, and can conclude the payment transaction without any need to walk to a station where a cashier is working at a sales register. The consumer can further obtain a copy of the purchase transaction receipt on her mobile device.

Walking through a simple example may be helpful in understanding the disclosed technology. A consumer can enter a store, such as Target® or Walmart®, and can select a number of items to purchase. She can take the items to a sales register, where she can provide a payment card such as a credit card, an ATM card, or a proxy card to a cashier. After ringing up the consumer's items, the cashier can take the consumer's payment card and can swipe the card through a card reader coupled to the sales register. The sales register can transmit the transaction information, such as the amount of the purchase, to a financial system, an example of a financial system being the system used by Target® or Walmart® to process credit card and ATM card purchase transactions. The sales register can further transmit the payment card information read from the consumer's payment card to the financial system. The financial system can transmit this purchase information and payment card information to a payment processing computer system. In some embodiments, the sales register can transmit the transaction information to the payment processing computer system, which can transmit the purchase information and the payment card information to a financial system.

The payment processing computer system can use the payment card information to determine a mobile device, such as a smartphone associated with the payment card. The payment processing computer system can transmit information to be displayed on the consumer's mobile device, such as the amount of the purchase transaction, line items of the purchase transaction, or a listing of payment accounts associated with a proxy card. The consumer can review the purchase transaction and determine whether to authorize the transaction. When the payment card is a proxy card, authorizing the transaction can include selecting a payment account associated with the proxy card to use for the payment. As part of the consumer authorizing the purchase transaction, the payment processing computer system can transmit a request to authorize the purchase transaction to the consumer's mobile device, where the request can be displayed. The consumer can use her mobile device review the purchase transaction and to electronically capture her signature or PIN to satisfy the authorization request. The consumer's mobile device can transmit the consumer's signature or ATM number to the payment processing computer system to indicate that the consumer authorizes the purchase transaction.

After receiving the customer's transaction authorization from the consumer's mobile device, the payment processing computer system can transmit a message to the financial system indicating the customer's authorization of the transaction. The financial system, after authorizing the purchase transaction, can transmit an authorization for the purchase transaction to the seller's sales register, thereby successfully completing the purchase transaction. The financial system authorization can indicate that the payment account being used to initiate the payment has access to adequate funds for the payment. Once the purchase transaction is successfully completed, the consumer is free to leave the store with the items that are part of the purchase transaction.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in one embodiment," "in other embodiments," "various embodiments," "some embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic. The terms "purchase transaction" and "transaction" are used interchangeably in this document and both have the same meaning.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

FIG. 1 is an illustration of components of or associated with a first embodiment of a system for authorizing a purchase transaction using a mobile device. Consumer 105 is about to make a purchase. In an example where consumer 105 is shopping at a store such as Target® or Walmart®, consumer 105 at some point finishes shopping for the desired items and takes the items to a cashier at a checkout line. The cashier rings up consumer 105's items using a sales register, the sales register being sales device 110 in this example. The cashier scans the items using scanner 108, which is coupled to sales device 110 and which transmits the scanned data to sales device 110. Sales device 110 receives the scanned data and rings up the items for the purchase transaction.

After the cashier finishes ringing up consumer 105's items and determines the total bill, and consumer 105 uses payment card 140, which can be for example a credit card, an automated teller machine (ATM) card, or a proxy card, to pay for the purchase. Payment card 140 is swiped through card reader 155, which reads the payment card information from the magnetic stripe of payment card 140. The payment card information can include, for example, identity information of the payment card, or meta data. Card reader 150 transmits the payment card information to the sales register (i.e. sales device 110), card reader 155 being coupled to sales device 110. The sales register, which can be for example a point of sale (POS) system, initiates a transaction authorization. The transaction authorization can be to ensure that the credit or bank account associated with payment card 140 has access to adequate funds to pay the total bill.

The sales register transmits the transaction information, such as the total amount of the purchase transaction, and the payment card information to financial system 160A to have the purchase transaction authorized. Financial system 160A, after determining that payment card 140 is associated with computer system 150 based on, for example, the payment card identity information or meta data, transmits the transaction information and the payment card information to computer system 150. The meta data can include, for example, an internet protocol (IP) address or computer system 150, or a phone number associated with computer system 150, or some other data or commands that indicate to the financial system to send the transaction information and the payment card information to computer system 150. Computer system 150, having access to a database that associates the payment card information with consumer 105's smartphone (i.e. mobile device 165), transmits a message that causes the transaction information to be displayed on consumer 105's smartphone. Consumer 105 can use the smartphone (i.e. mobile device 165) to review the transaction information, for example consumer 105 can make sure that the total amount is correct. When consumer 105 makes a purchase at a business, such as a restaurant, where tips are accepted, the transaction information can include a display enabling consumer 105 to enter or select a tip amount.

Figure 10:
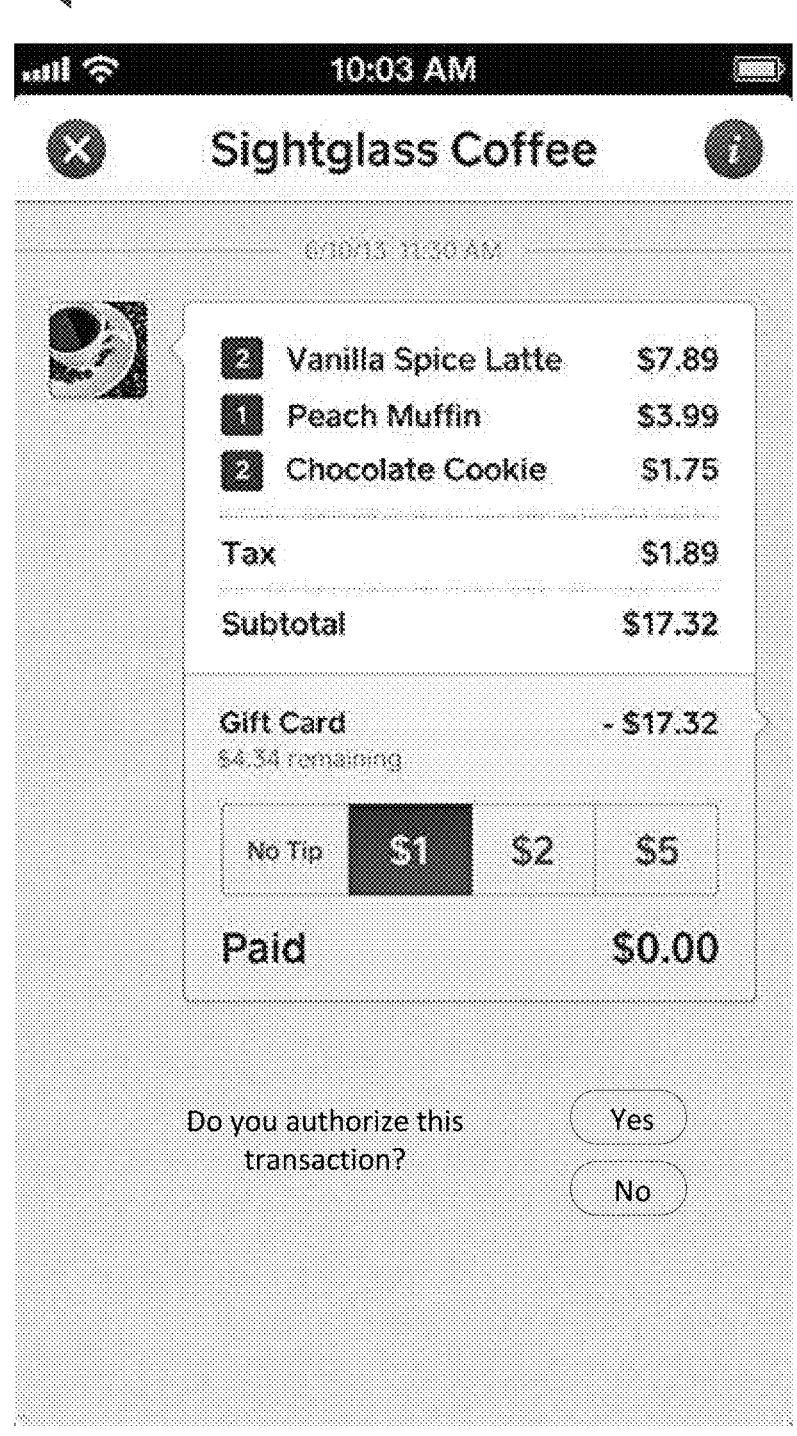
FIG. 10 is an illustration of transaction information being displayed on a smartphone.
Figure 13:
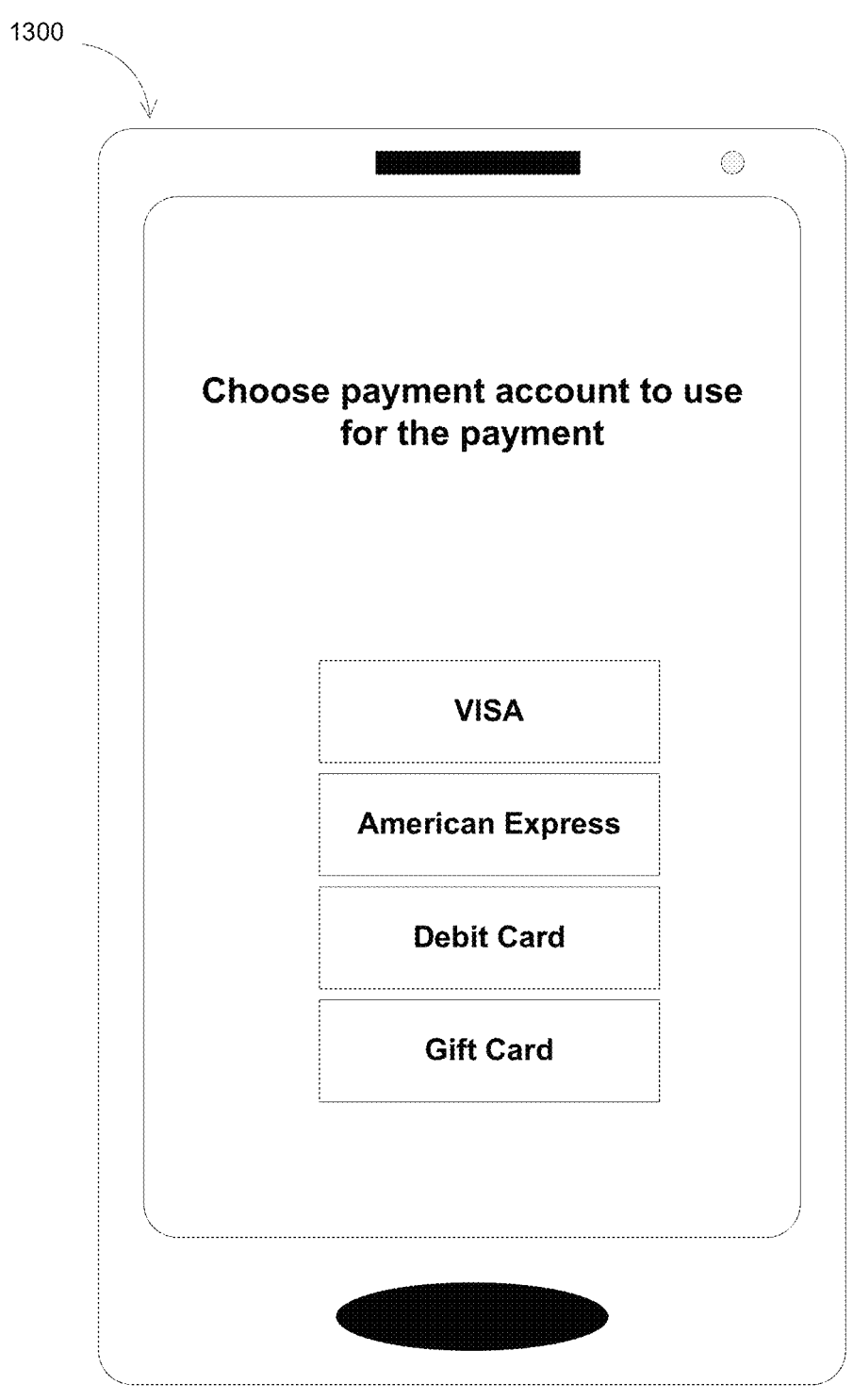
FIG. 13 is an illustration of a listing of payment accounts associated with a proxy card being displayed on a smart-phone.

FIG. 10 contains an example of transaction information for a different purchase transaction (i.e. for a purchase transaction not related to the current example) being displayed on a smartphone. Display 1000 of FIG. 10 illustrates an example of a display enabling a customer to select a tip amount. Other displays can enable a customer to enter a tip amount, the tip amount being any amount of money that the customer desires to provide as a tip. When payment card 140 is a proxy card, computer system 150 can access a database that associates multiple payment accounts with the proxy card. Computer system 150 can transmit a message that causes a listing of one or more of the payment accounts to be displayed on consumer 105's smartphone. Consumer 105 can use the smartphone to indicate a selection of the payment account to use to initiate payment for the purchase transaction. Display 1300 of FIG. 13 illustrates an example of a listing of payment accounts being displayed on a smartphone, to enable a consumer to select the payment account to use to initiate the payment. As part of consumer 105's authorization of the transaction, consumer 105 can use mobile device 165 to electronically capture consumer 105's signature or PIN.

Mobile device 165, after electronically capturing, as part of consumer 105's authorization of the transaction, consumer 105's signature or PIN number, or consumer 105's selection of the payment account to authorize using the selected payment account to initiate the payment, can transmit this consumer authorization information to computer system 150. When the transaction information includes a display enabling or in some other way enables consumer 105 to enter a tip amount, the consumer information can include a tip amount that is authorized by consumer 105. Computer system 150, upon receipt of this consumer authorization information, can transmit the consumer authorization information to financial system 160A. Financial system 160A can use the consumer authorization information, along with other information, to determine to authorize the purchase transaction. Financial system 160A, having determined to authorize the purchase transaction, can transmit a transaction authorization to the cashier's sales register (i.e. sales device 110), and the cashier can complete the purchase transaction. In some embodiments, computer system 150 authorizes the purchase transaction and sends the transaction authorization to the cashier's sales register. At this point, consumer 105 is free to leave the store with the items that are part of the purchase transaction.

Figure 2:
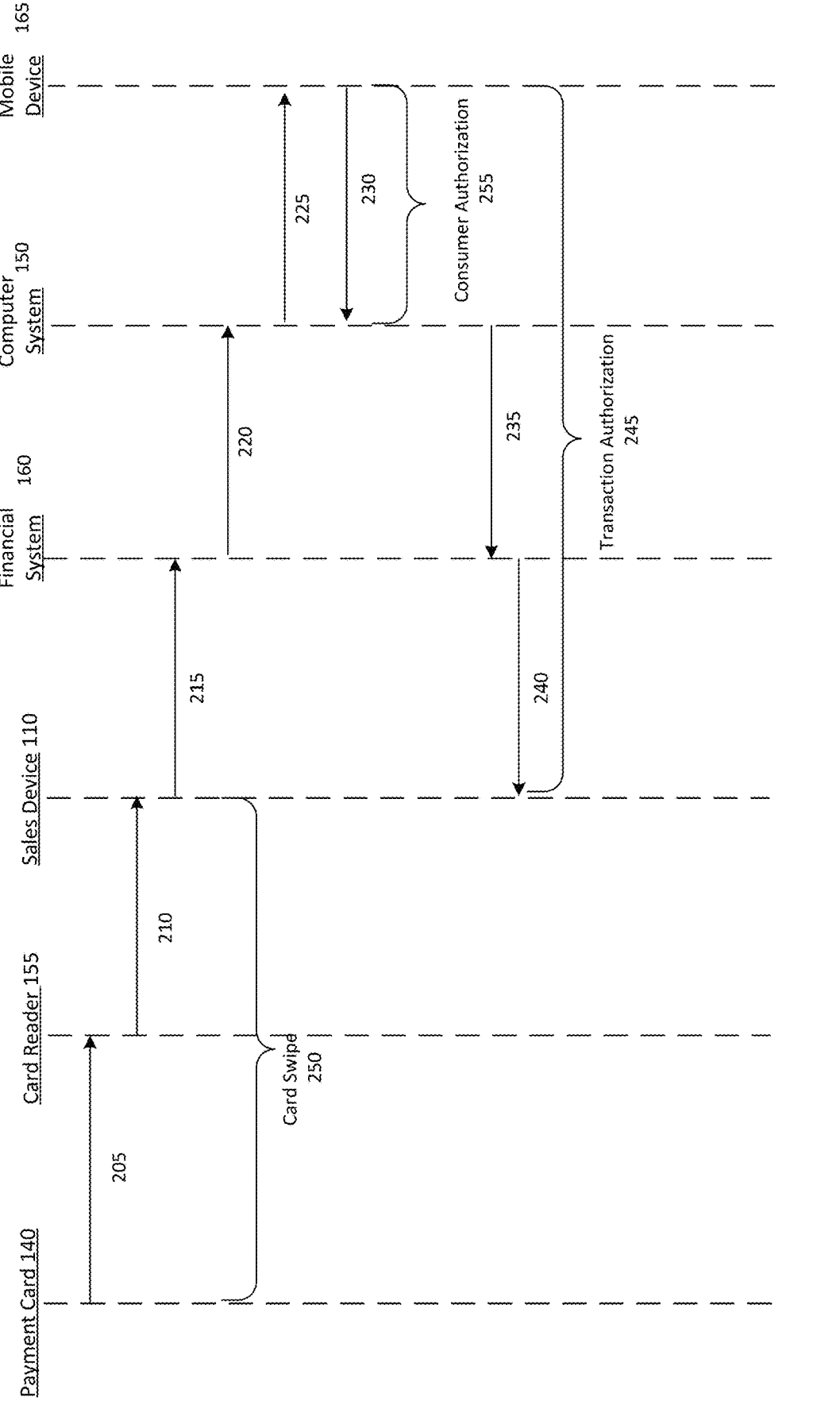
FIG. 2 is a diagram illustrating a method for authorizing a purchase transaction using a mobile device.

FIG. 2 is a diagram illustrating a method for authorizing a purchase transaction using a mobile device. The following description of FIG. 2 will be described using the embodiment and components of the illustration of FIG. 1, and will refer to labels of FIG. 1. This is a non-limiting example and is done with the intent of making the description of FIG. 2 easier to understand.

The purchase process as illustrated in FIG. 2 has two primary phases, card swipe 250 and transaction authorization 245. A portion of transaction authorization 245 is consumer authorization 255. The first phase is card swipe 250. A consumer has payment card 140, which can be for example a credit card, an automated teller machine (ATM) card, or a proxy card, some instances of each card having a magnetic stripe. In the example of FIG. 1 where consumer 105 is shopping at Target® or Walmart®, consumer 105 takes the items obtained while shopping to a checkout stand. Once consumer 105 reaches the checkout stand, a sales clerk scans consumer 105's items using scanner 108, the scanner transmitting the scanned data to sales device 110. The sales clerk, using sales device 110, rings up consumer 105's items by either scanning the product codes of the items using scanner 108 or by entering the product code into sales device 108 using, for example, the keyboard of sales device 108.

Figure 4:
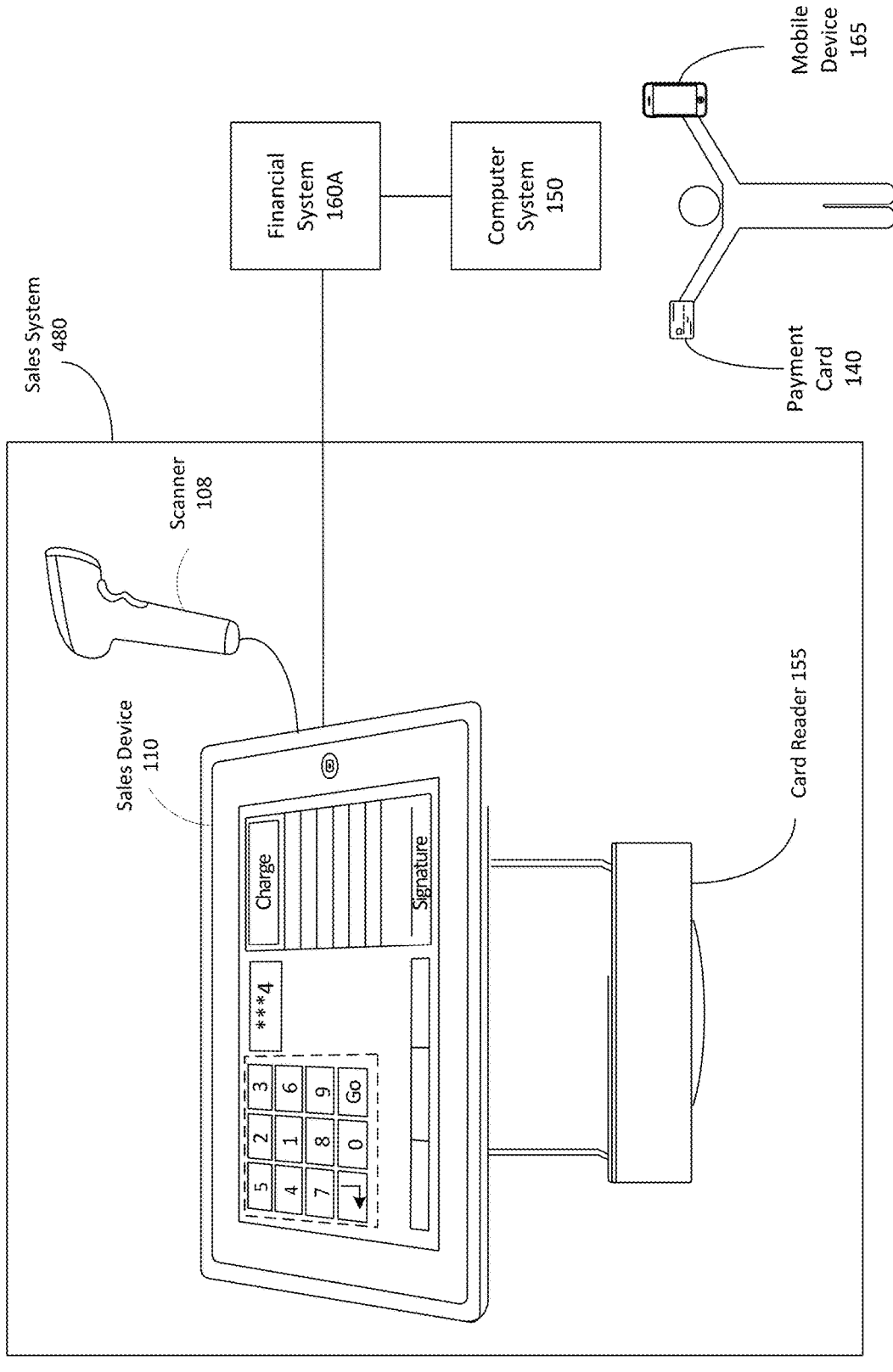
FIG. 4 is an illustration of components of or associated with a third embodiment of a system for authorizing a purchase transaction using a mobile device.

Once consumer 105's items have been rung up by the sales clerk using sales device 110 and scanner 108, a card swipe 250 phase is initiated. At step 205, consumer 105 uses payment card 140 to pay for the purchase, and card reader 155 reads information from the magnetic strip of payment card 140. At step 210, card reader 155 transmits the information obtained from payment card 140 to sales device 110 completing the card swipe phase of the purchase transaction. Sales device 110, scanner 108, and card reader 155 can comprise a sales system, as illustrated in the embodiment of FIG. 4 where sales system 480 comprises sales device 110, scanner 108, and card reader 155.

Transaction authorization 245, where consumer 105's purchase transaction is authorized, starts at step 215. At step 215, sales device 110 transmits part or all of the payment card information, obtained by card reader 155 from payment card 140, to financial system 160. Sales device 110 can further transmit transaction information related to the purchase that consumer 105 desires to make to financial system 160. For example, sales device 110 can transmit the total amount of the purchase, or the line items of the purchase, to financial system 160.

Figure 3:
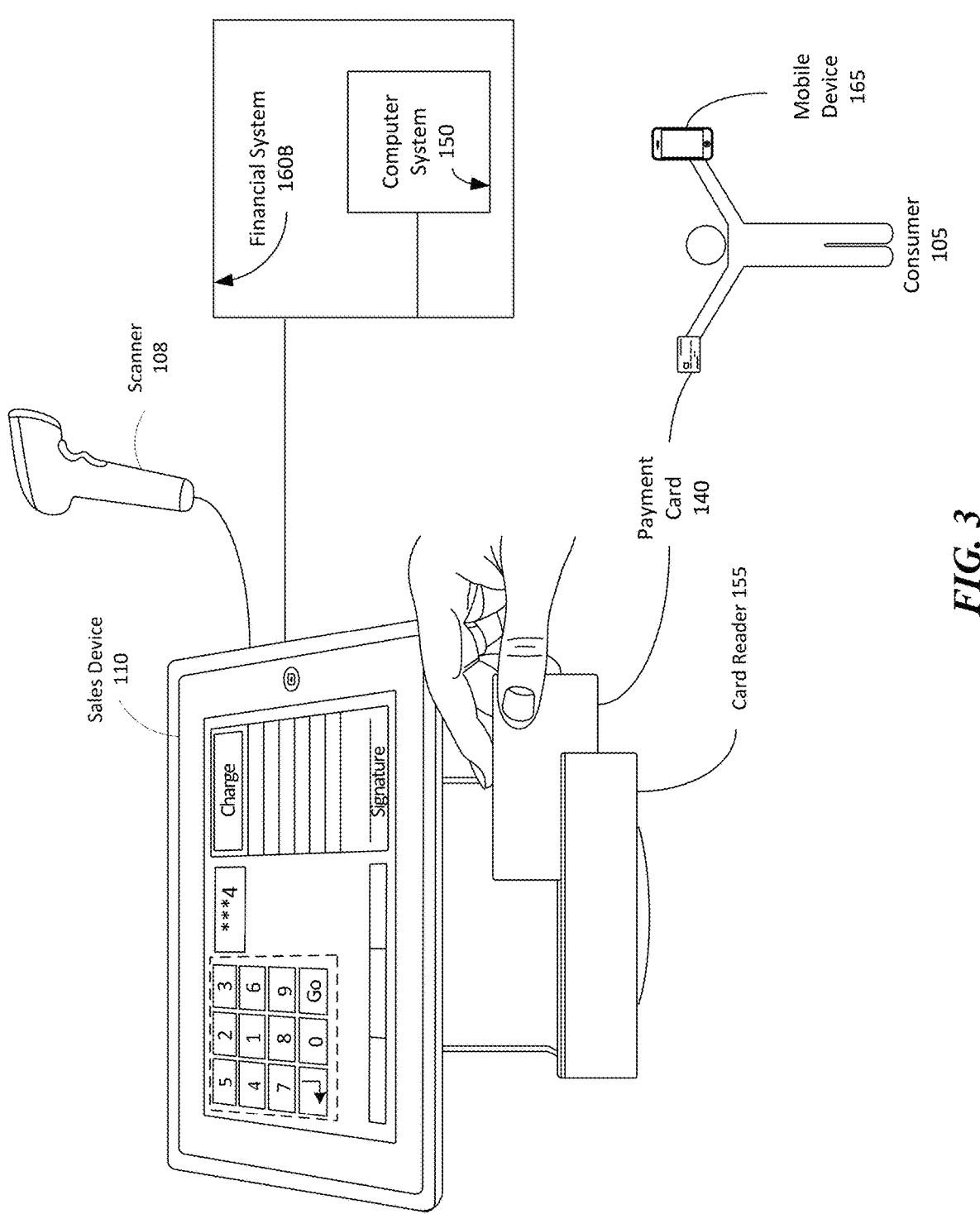
FIG. 3 is an illustration of components of or associated with a second embodiment of a system for authorizing a purchase transaction using a mobile device.

Financial system 160 can be, for example, the system used by Target® or Walmart® to process credit card and ATM card purchase transactions. As will be appreciated, financial system 160 can take on any one of a variety of suitable embodiments. For example, financial system 160 can be financial system 160A of FIG. 1. In this example, financial system 160A does not include computer system 150. In another example, financial system 160 can be financial system 160B of FIG. 3. FIG. 3 is an illustration of components of or associated with a second embodiment of a system for authorizing a purchase transaction using a mobile device. In this example, financial system 160B includes computer system 150. In some embodiments, sales device 110 transmits part of all of the payment card information to computer system 150.

As will be appreciated, data transmitted or received by a component of a system is also transmitted or received by the system of which the component is a part. For example, in FIG. 4, sales device 110 is part of a sales system (i.e. sales device 110 is part of sales system 480). In FIG. 4, any data that is transmitted or received by sales device 110 is also transmitted or received by the sales system of which sales device 110 is a part (i.e. by sales system 480). For example, in step 215 as applied to FIG. 4, the payment card information that is transmitted by sales device 110 is also transmitted by sales system 480. Similarly, any data that is received by sales device 110 is also received by sales system 480.

At step 220, financial system 160, having determined that payment card 140 is associated with computer system 150 based on, for example, the identity information or meta data of payment card 140, transmits at least part of the transaction information and the payment card information to computer system 150. In some embodiments, such as in FIG. 1, computer system 150 is not part of financial system 160. In other embodiments, such as in FIG. 3, computer system 150 is part of financial system 160. In some embodiments, computer system 150 receives the transaction information and the payment card information from sales device 110.

Computer system 150, having access to a database that associates the payment card information with mobile device 165, for example a smartphone owned by consumer 105, at step 225 transmits a message that causes the transaction information to be displayed on consumer 105's smartphone, starting consumer authorization 255, a sub-part of transaction authorization 245. FIG. 10 contains an example of transaction information for a different purchase transaction (i.e. for a purchase transaction not related to the current example) being displayed on a smartphone. Consumer 105 can use mobile device 165 to review the transaction information, for example consumer 105 can make sure that the total amount is correct. When payment card 140 is a proxy card, computer system 150 can access a database that associates multiple payment accounts with the proxy card. Computer system 150 at step 225 can transmit a message that causes a listing of one or more of the payment accounts to be displayed at mobile device 165. Consumer 105 can use mobile device 165 to indicate a selection of the payment account to use to initiate payment for the purchase transaction.

The message transmitted at step 225 further contains a consumer authorization request. As part of an authorization of the transaction, and to satisfy the consumer authorization request, consumer 105 can use mobile device 165 to electronically capture consumer 105's signature or personal identification number (PIN), or can select the payment account. When consumer 105 makes a purchase at a business, such as a restaurant, where tips are accepted, the consumer authorization request can include a display enabling consumer 105 to enter or select a tip amount. FIG. 10 contains an example of a display enabling a customer to select a tip amount. Other displays can enable a customer to enter a tip amount, the tip amount being any amount of money that the customer desires to provide as a tip.

At step 230, mobile device 165 (i.e. consumer 105's smartphone in the example of FIG. 2), after electronically capturing, to satisfy the consumer authorization request as part of the transaction authorization, consumer 105's signature or PIN or the selection of the payment account, can transmit this consumer authorization information to computer system 150. The consumer authorization information can be response information, sent in response to the consumer authorization request. When the consumer authorization request includes a display enabling or some other method to enable consumer 105 to enter a tip amount, the consumer authorization information can include a tip amount that is authorized by consumer 105. The tip amount can be added to the total amount of the purchase transaction. Computer system 150, at step 235, can transmit the consumer authorization information to financial system 160, which can determine the results of transaction authorization 245. Two of the possible results of transaction authorization 245 are that the purchase transaction is authorized, in which case financial system 160 can transmit a transaction authorization at step 240 to sales device 110, or that the purchase transaction is declined, in which case financial system 160 can transmit a message at step 240 declining the transaction to sales device 110. In some embodiments, computer system 150 determines the results of the transaction authorization, and transmits the results of the transaction authorization to sales device 110.

At this point, assuming that the purchase transaction was authorized (i.e. the result of transaction authorization 245 is that the purchase transaction was authorized), the purchase transaction is complete and the consumer is free to walk out of the store with the items that are part of the purchase transaction.

FIG. 4 is an illustration of components of or associated with a third embodiment of a system for authorizing a purchase transaction using a mobile device. The following description of FIG. 4 will be described using the embodiment and components of the illustration of FIG. 1, and will refer to labels of FIG. 1. This is a non-limiting example and is done with the intent of making the description of FIG. 4 easier to understand.

As illustrated in FIG. 4, sales device 110, scanner 108, and card reader 155 can comprise sales system 480. Sales system 480, as configured in FIG. 2, illustrates one embodiment of a sales system. A person having ordinary skill in the art will appreciate that sales system 480 can work in various other embodiments. In one embodiment, sales system 480 can be a point of sale system. In another embodiment, sales device 110 can be a point of sales system and sales device 110 can be one component of sales system 480. In another embodiment, sales device 110 and sales system 480 can be one and the same. For example, sales device 110 can be a point of sales system and sales system 480 can be the same point of sales system. Sales system 480 can be a payment terminal system.

Sales system 480 can include any component associated with processing a purchase transaction. A component can be associated with processing a purchase transaction when the component assists in identifying purchase transaction items, or assists in identifying the payment mechanism associated with the purchase transaction, or assists in receiving the payment, or assists in processing cash or other proxies for money, such as checks, money orders, travelers checks, and the like associated with the purchase transaction, or assists in calculations associated with the purchase transaction, or assists in tracking inventory effects of purchase transactions, or provides any other assistance related to the purchase transaction.

Examples of sales systems and components of sales systems include point of sale (POS) systems, cash registers, computer systems running sales applications including mobile devices running sales applications, cloud based POS systems, checkout registers, computer systems running internet based applications such as a web browser, mobile devices running sales applications, fixed function devices (i.e. hardware devices without a general purpose operating system) configured to function as sales devices, card readers, scanners, automated money acceptance devices, automated change devices, self-serve point of sales systems (i.e. systems where a consumer can scan or enter the items to be purchased, can provide a payment card, and can complete a purchase transaction without the assistance of a store employee), and the like.

Sales system 480 can obtain information associated with payment object 740 of FIG. 7 (payment object 740 can be payment card 140), the information being part of the payment object information. In embodiments where payment object 740 is a magnetic stripe card or a re-programmable magnetic stripe card, sales system 480 can read the magnetic stripe. In embodiments where payment object 740 is a smart card, sales system 480 can communicate with the smart card to obtain information related to payment object 740. In embodiments where payment object 740 is a proximity card, sales system 480 can cause the proximity card to transmit information associated with the proximity card, such as a radio frequency identification (RFID), which sales system 480 can receive. In embodiments where payment object 740 is a card with a QR code or bar code, sales system 480 can obtain the QR code or bar code, for example, by scanning the bar code or QR code. Sales system 480 can further transmit the payment object information to financial system 160A, as well as financial system 160 of FIG. 2, financial system 160B of FIG. 3, and financial system 160C of FIG. 8 (via computer system 150B for financial system 160C).

Financial system 160A (as well as financial system 160 of FIG. 2, financial system 160B of FIG. 3, and financial system 160C of FIG. 8) can be any financial system that processes payment transactions. For example, financial system 160A can comprise a payment processing service, such as Bank of America Merchant Services, a financial service, such as VISA's VisaNet Payment System, and a banking service, such as Citibank. In some embodiments, a financial system can include computer system 150.

FIG. 5 is an illustration of components of or associated with a fourth embodiment of a system for authorizing a purchase transaction using a mobile device. The following description of FIG. 5 will be described using the embodiment and components of the illustration of FIG. 1, and will refer to labels of FIG. 1. This is a non-limiting example and is done with the intent of making the description of FIG. 5 easier to understand.

Some components of FIG. 5 are described above in the descriptions of FIGS. 1-4. FIG. 5 is an embodiment of a system wherein financial system 160B includes computer system 150, and sales system 480 is coupled to financial system 160B and to computer system 150 (via financial system 160B). Computer system 150 can be included in financial system 160B when computer system 150 is owned by an entity or an individual associated with financial system 160B, or when computer system 150 is controlled by an entity or an individual associated with financial system 1606, or when computer system 150 is connected to a network owned or under the control of an entity or individual associated with financial system 160B, or when computer system 150 has any other association with financial system 160B related to processing purchase transactions.

Figure 6:
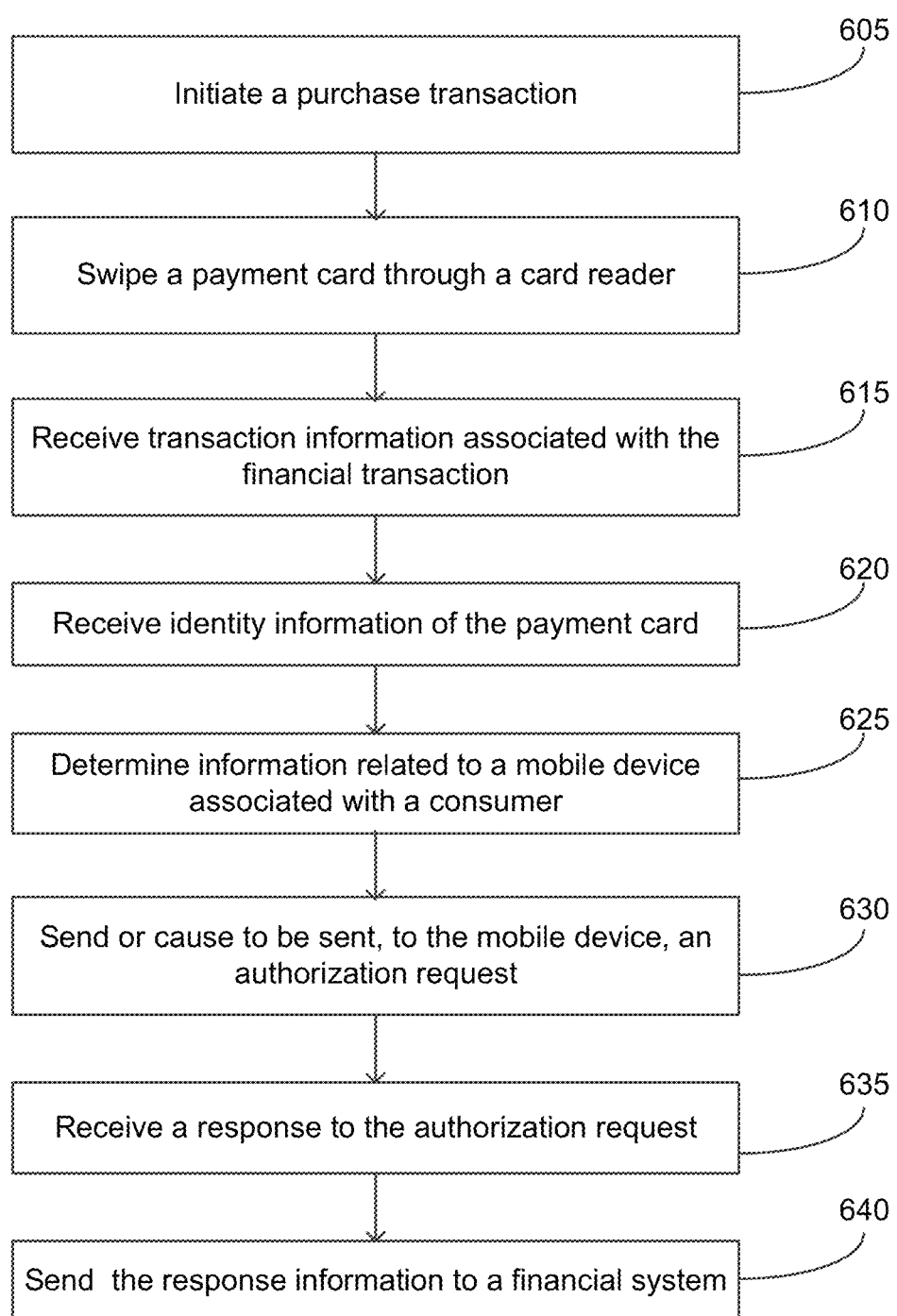
FIG. 6 is a flow chart illustrating exemplary operations of a first embodiment of a method for authorizing a transaction using a mobile device.

FIG. 6 is a flow chart illustrating exemplary operations of a first embodiment of a method for authorizing a transaction using a mobile device. The following description of FIG. 6 will be described using the transaction illustrated in FIG. 2, and will refer to labels of that figure. This is a non-limiting example and is done with the intent of making the description of FIG. 6 easier to understand.

It is noteworthy that, in some embodiments, including the embodiments of FIG. 1, FIGS. 3-5, and FIG. 7, all steps of the method of FIG. 6 can be carried out by computer system 150. Step 605 includes initiating a purchase transaction. A consumer can present a payment card to make a payment associated with a financial transaction. For example, the consumer can purchase a coffee from a merchant. To pay for the coffee, the consumer can present the payment card to the merchant. The purchase transaction can be initiated based on the proxy card being used to initiate a payment to the merchant, such as by swiping the proxy card using a card reader, an optical scanner, etc. associated with and/or coupled to the merchant's sales system, or by the consumer otherwise indicating an intent to make a purchase.

Step 610 includes swiping a payment card through a card reader. Step 610 can occur after step 605, or can be the event that triggers step 605. The term "swipe" here refers to any manner of triggering a physical card reader to read or obtain information from a physical card, such as passing a card through a magnetic stripe reader, smartcard reader, optical code reader, radio frequency identification (RFID) reader, etc. Step 610 can involve a payment card, such as payment card 140, being swiped though a card reader, such as card reader 155, as is depicted in FIG. 1. As is discussed in the description of FIG. 7, swipe also refers to the manners in which sales system 480 can obtain information associated with payment object 740.

Step 615 includes receiving transaction information associated with a purchase transaction. A computer system, such as computer system 150, can receive the transaction information, which can be sent by a sales system, such as sales system 480. Using the example of FIG. 2, at step 220 at least part of the transaction information is transmitted to computer system 150, and computer system 150 receives the transaction information. The transaction information is information associated with the purchase transaction and can include an amount of the purchase transaction, a listing of one or more of the items/services/etc. associated with the purchase transaction, or identifying information for the merchant, such as an identification number or character string that enables identification of the merchant, among other information.

As discussed above related to FIG. 1, at step 215 sales device 110 transmits the transaction information, such as the total amount of the bill, and the payment card information to financial system 160A. Sales device 110 can further be part of a sales system that also includes card reader 155 and scanner 108, and any data transmitted or received by sales device 110 is also transmitted or received by the sales system of which sales device 110 is a part. Accordingly, the transaction information transmitted by sales device 110 at step 215 can also be transmitted by the sales system of which sales device 110 is a part. At step 220 computer system 150 receives the transaction information, and the transaction information, which is associated with the purchase transaction, can be from a sales system of which sales device 110 is a part, as per step 615.

Step 620 includes receiving identity information of the payment card. The identity information can have been obtained from the payment card using the card reader, and includes information that enables the identification of the payment card or an account associated with the payment card. Using the example of FIG. 2, at step 220 at least part of the payment card information is transmitted to computer system 150, and computer system 150 receives the payment card information. The payment card information can include identity information, such as an number or text string that identifies the payment card or an account associated with the payment card. The payment card information of FIG. 2 was obtained from payment card 140 when payment card 140 was swiped through card reader 155 and card reader 155 read the payment card information from the magnetic stripe of payment card 140. As illustrated in FIG. 1, payment card 140 is associated with consumer 105.

At step 210, card reader 155 transmits the payment card information to sales device 110, which at step 215 transmits the payment card information to financial system 160. Financial system 160 transmits the payment card information to computer system 150 at step 220. The payment card information received by computer system 150 is from card reader 155 via both sales device 110 and financial system 160. As discussed related to step 615, any data transmitted or received by sales device 110 is also transmitted or received by the sales system of which sales device 110 is a part. Accordingly, computer system 150 receives, from a sales system of which sales device 110 is a part, payment card information including identity information, the payment card information having been obtained using card reader 155 from payment card 140, a payment card associated with consumer 105, as per step 620.

Step 625 includes determining information related to a mobile device associated with a customer. Computer system 150 can have access to a database that associates the payment card, such as payment card 140, with a mobile device, such as mobile device 165. Computer system 150 can access the database to obtain, for example, contact information for the mobile device, such as the internet protocol (IP) address or phone number of the mobile device, or an email address associated with the mobile device, such as consumer 105's email address.

Step 630 includes sending or causing to be sent an authorization request. Using the example of FIG. 2, at step 225 computer system 150 transmits a message that causes the transaction information to be displayed on consumer 105's smartphone (i.e. mobile device 165), starting consumer authorization 255. The message transmitted at step 225 further contains a consumer authorization request, which can be a request for the consumer to authorize the purchase transaction. Accordingly, at step 225 computer system 150 sends a message containing a request to authorize a purchase transaction to mobile device 165, a mobile device associated with consumer 105, as per step 630. Alternatively, computer system 150 can send a message to another computer system that causes the other computer system to send the message containing the authorization request to mobile device 165.

Step 635 includes receiving a response to the authorization request. Using the example of FIG. 2, at step 230 mobile device 165 (i.e. consumer 105's smartphone), as part of the transaction authorization and to satisfy the consumer authorization request, can transmit consumer 105's signature or PIN, or the payment account selected by consumer 105, to computer system 150. The consumer authorization is a response to the consumer authorization request and the electronically captured signature and PIN and an indication of the selected payment account are response information. Hence, at step 230 computer system 150 receives the consumer authorization, the consumer authorization being a response to the authentication and which can include response information. The response and the response information are from mobile device 165, a mobile device associated with consumer 105.

Step 640 includes sending the response information to a financial system. Using the example of FIG. 2, at step 235 computer system 150 can transmit the consumer authorization information to financial system 160, and the response or consumer authorization information can include the electronically captured signature or PIN, or the indication of the selected payment account. Financial system 160 at step 240 can transmit a transaction authorization to sales device 110, financial system 160 being configured to send a transaction authorization to sales device 110. As discussed related to step 615, any data transmitted or received by sales device 110 is also transmitted or received by the sales system of which sales device 110 is a part. Hence, financial system 160 at step 240 can transmit a transaction authorization to a sales system of which sales device 110 is a part. Accordingly, computer system 150 sends the consumer authorization information, the consumer authorization information being part of the response information, to financial system 160, as per step 640.

FIG. 7 is an illustration of components of or associated with a fifth embodiment of a system for authorizing a purchase transaction using a mobile device. Consumer 105 is about to make a purchase. In an example where consumer 105 is shopping at a store such as Target® or Walmart®, consumer 105 at some point finishes shopping for the desired items and takes the items to a cashier at a checkout line. The cashier rings up consumer 105's items using a sales register, the sales register, a card reader, and a scanner all components of sales system 480 in this example. The cashier scans the items using the scanner of sales system 480, and the sales register rings up the items for the purchase transaction.

After the cashier finishes ringing up consumer 105's items and determines the total bill, consumer 105 presents payment object 740, which can be, for example, a credit card, an automated teller machine (ATM) card, a proxy card, or a mobile device, to the seller. Payment object 740 is compatible with sales system 750 and with financial system 160A. Because payment object 740 is compatible with sales system 480, sales system 480 can obtain information associated with payment object 740 sufficient to enable initiation of a transaction authorization, such as transaction authorization 245 of FIG. 2. Because payment object 740 is compatible with financial system 160A, financial system 160A can determine a payment mechanism, such as a credit account associated with a credit card or a bank account associated with an ATM card, that is associated with payment object 740, and can determine whether to approve a purchase transaction made using payment object 740.

Using the method diagrammed in FIG. 2 as an example, payment object 740 can be payment card 140. Payment object 740 (i.e. payment card 140) is compatible with the sales system of which sales device 110 and card reader 155 of FIG. 2 are a part, in that the sales system can obtain information related to payment object 740 sufficient to enable initiation of a transaction authorization. For example, card reader 155 of the sales system including card reader 155 and sales device 110 can read the magnetic stripe of payment card 140 (i.e. payment object 740). The payment card information read from payment card 140 can be sufficient to enable initiation of transaction authorization 245 of FIG. 2 by the sales system, transaction authorization 245 initiated by a transmission from sales device 110 to financial system 160. Further, payment object 740 is compatible with financial system 160 of FIG. 2, in that financial system 160 can determine a payment mechanism, such as a credit card or an ATM card, that is associated with payment object 740 (i.e. payment card 140) and can determine whether to approve a purchase transaction made using payment object 740.

As another example, payment object 740 can be a mobile device, such as mobile device 165. In embodiments where payment object 740 is a mobile device, sales system 480 can obtain identity information and other information for the mobile device or a digital wallet associated with the mobile device. Sales system 480 can obtain the identity and other information from mobile device 165 via, in various embodiments, WiFi, 3G, 4G, Near Field Communication (NFC), or Bluetooth, or can obtain the identity and other information via a QR code or a bar code or any machine readable code from the mobile device, for example, by scanning a QR code or bar code displayed by the mobile device.

Sales system 480 can obtain information from payment object 740 (i.e. the payment object information) sufficient to enable initiation of a transaction authorization, such as transaction authorization 245 of FIG. 2, and sales system 480 can initiate the transaction authorization by transmitting the payment object information and the transaction information to financial system 160A. The transaction authorization can be to ensure that a payment mechanism, such as a credit account or bank account, associated with payment object 740 has access to adequate funds to pay the total bill.

Sales system 480 and financial system 160A can establish a communication channel between themselves. Once established, sales system 480 can transmit the transaction information and the payment object information to financial system 160A to have the purchase transaction authorized. The transaction information can include an amount of the purchase transaction and line items from the purchase transaction, and the payment object information can include identity information for payment object 740 (i.e. payment object identity information). Financial system 160A, after determining that payment object 740 is associated with computer system 150 based on, for example, the payment object identity information, transmits the transaction information and the payment object information to computer system 150. Computer system 150, having access to a database that associates the payment object information with mobile device 165, transmits a message that causes the transaction information to be displayed on mobile device 165. Consumer 105 can use mobile device 165 to review the transaction information, for example consumer 105 can make sure that the line items and the total amount are correct. As part of consumer 105's authorization of the transaction, consumer 105 can use mobile device 165 to electronically capture consumer 105's signature or PIN, or to select the payment account to use to initiate the payment.

Mobile device 165, after electronically capturing consumer 105's signature or PIN number or payment account selection as part of consumer 105's authorization of the transaction, can transmit this consumer authorization information to computer system 150. Computer system 150, upon receipt of this consumer authorization information, can transmit the consumer authorization information to financial system 160A. Financial system 160A can use the consumer authorization information, along with other information, to determine whether to authorize the purchase transaction. Financial system 160A, upon determining to authorize the purchase transaction, can transmit a transaction authorization to sales system 480, and the cashier can complete the purchase transaction. At this point, consumer 105 is free to leave the store with the items that are part of the purchase transaction.

Payment object 740 can be compatible with financial system 160A, as well as financial system 160 of FIG. 2, financial system 1606 of FIG. C, and financial system 160C of FIG. 8. In various embodiments, payment object 740 can be a magnetic stripe card, a smart card, a proximity card, a re-programmable magnetic stripe card, a card containing a quick response (QR) code, or a card containing a bar code. Payment object 740 can be various payment mechanisms or can be associated with various payment mechanisms, including credit cards, charge cards, ATM cards, debit cards, pre-paid credit cards, pre-paid debit cards, gift cards, stored value cards, and fleet cards, among others. The payment mechanisms can be associated with payment object 740 by, for example, being linked to payment object 740. The link can be implemented, for example, using a database which links or associates payment object 740 with the payment mechanisms.

Further, payment object 740 can be associated with loyalty programs, wherein the loyalty programs are another type of payment mechanism which can be used to make the purchase. In some embodiments, payment object 740 can be a mobile device. Examples of mobile devices include smartphones such as an iPhone, tablets such as an iPad©, portable media devices such as an iPod©, wearable devices such as Google Glass© or Samsung Smartwatch©, or a laptop or other portable computer.

FIG. 8 is an illustration of components of or associated with a sixth embodiment of a system for authorizing a purchase transaction using a mobile device. In this example, consumer 105 can be a customer of a restaurant. A waiter can take consumer 105's order using sales system 480, for example a mobile device such as an iPad© with a coupled card reader, consumer 105's order being part of a purchase transaction. After taking consumer 105's order using sales system 480 (i.e. the iPad© with the coupled card reader), the waiter can use sales system 480 to obtain payment object information from payment object 740, payment object 740 intended to pay for and used to pay for consumer 105's order (i.e. the purchase transaction). For example, the waiter can use the card reader coupled to the iPad© (i.e. sales system 480) to obtain credit card information (i.e. payment object information) from a credit card (i.e. payment object 740). The payment object information obtained from payment object 740 can be sufficient to enable initiation of a transaction authorization by sales system 480. The transaction authorization can be initiated by a transmission from sales system 480 to computer system 150B.

When payment object 740 is a proxy card or proxy object, computer system 150B can access a database containing association information representing an association between the proxy card or proxy object and multiple payment accounts or other types of electronic accounts. Computer system 150B can determine a payment account to use to initiate the payment in several ways. In one example, computer system 150B causes one or more of the payment accounts associated with the proxy card or proxy object to be displayed on mobile device 165, and consumer 105 indicates a selection of the payment account to use to initiate the payment. In another example, computer system 150B determines a payment account associated with the proxy card or proxy object to use to initiate the payment. The determination can be based on consumer 105 having previously indicated a payment account to use for this transaction, or based on the payment account used for previous purchases at that merchant, or that day, or based on the user's location, or based on only one payment account being linked to the proxy card or proxy object.

Further, payment object 740 is compatible with financial system 160C, in that financial system 160C can determine a payment mechanism that is associated with payment object 740, and can determine whether to approve a purchase transaction made using payment object 740. For example, the credit card (i.e. payment object 740) is compatible with financial system 160C, in that financial system 160C can determine a credit account that is associated with the credit card from which to obtain funds to pay for the current purchase transaction. In some embodiments, financial system 160C can determine a credit account associated with the credit card by performing a database operation to determine a credit account associated with the credit card. In some embodiments, financial system 160C can determine a credit account associated with the credit card by receiving a message from computer system 1506 wherein the message identifies a credit account that is associated with the credit card. In some embodiments, sales system 480 can obtain credit account information from payment object 740 and can transmit a message containing the credit account information to computer system 150B, which can transmit the message to financial system 160C. Financial system 160C can determine a credit account associated with the credit card by receiving the message and obtaining the credit account information obtained from payment object 740 from the received message.

In some embodiments where payment object 740 is a mobile device, sales system 480 can obtain digital wallet information associated with payment object 740 (i.e. the mobile device), and can initiate a transaction authorization by transmitting information associated with the digital wallet (i.e. the digital wallet information) and the purchase transaction information to computer system 1506. The purchase transaction information can include, for example, an amount of the purchase. The transaction information can further include a display enabling consumer 105 to enter or select a tip amount. FIG. 10 contains an example of a display on a mobile device enabling a customer to select a tip amount. Other displays can enable a customer to enter a tip amount, the tip amount being any amount of money that the customer desires to provide as a tip. In some embodiments, sales system 480 can transmit part or all of the digital wallet information to a compute server and the compute server can respond with a transmission containing a payment mechanism associated with the digital wallet. Sales system 480 can then transmit the payment mechanism information and the purchase transaction information to computer system 150B to initiate the purchase transaction authorization.

In some embodiments, computer system 150B can determine a payment mechanism, such as a credit card or a credit account that is associated with payment object 740, or a digital wallet that is associated with payment object 740. Computer system 150B can transmit the payment mechanism information and the purchase transaction information to financial system 160C. Financial system 160C can determine the payment mechanism information by receiving the transmitted data from computer system 150B and obtaining the payment mechanism information from the transmitted data. Financial system 160C can further determine whether to approve the purchase transaction, and when approved, can transmit an authorization for the purchase transaction to computer system 1506.

In some embodiments, computer system 150B, having access to a database that associates payment object 740 with mobile device 165, transmits a message that causes the purchase transaction information to be displayed on mobile device 165. Consumer 105 can use mobile device 165 to review the transaction information, for example consumer 105 can make sure that the total amount is correct or can review line items of the purchase transaction. The transaction information can also include a display enabling consumer 105 to enter or select a tip amount, or some other way of enabling consumer 105 to enter of select a tip amount. FIG. 10 contains an example of transaction information for a different purchase transaction (i.e. for a purchase transaction not related to the current example) being displayed on a smartphone. FIG. 10 also provides an example of a display enabling a customer to select a tip amount. Other displays can enable a customer to enter a tip amount, the tip amount being any amount of money that the customer desires to provide as a tip.

As part of an authorization of the transaction, consumer 105 can use mobile device 165 to electronically capture consumer 105's signature or PIN. In some embodiments, computer system 150B transmits the message that causes the purchase transaction information to be displayed on mobile device 165 before obtaining a transaction authorization for the current purchase transaction from financial system 160C. In some embodiments, computer system 150B transmits the message that causes the purchase transaction information to be displayed on mobile device 165 after obtaining a transaction authorization for the current purchase transaction from financial system 160C.

In some embodiments, financial system 160C will not provide a transaction authorization for the current purchase transaction until financial system 160C receives consumer authorization information, such as the data transmitted from mobile device 165 to computer system 150 during consumer authorization 255 of FIG. 2. In some embodiments, financial system 160C will provide a transaction authorization for the current purchase transaction before or even without receiving consumer authorization information, such as the data transmitted from mobile device 165 to computer system 150 during consumer authorization 255 of FIG. 2.

After computer system 150B transmits the message that causes the purchase transaction information to be displayed on mobile device 165, mobile device 165 can electronically capturing consumer 105's signature or PIN number. Consumer 105's signature or PIN can indicate consumer 105's authorization of the purchase transaction. For some purchase transactions, neither a signature nor a PIN is required. When neither a signature or PIN is required, consumer 105 can indicate an authorization of the purchase transaction in any other compatible way. One example of such a way is by selecting a virtual button on mobile device 165, the virtual button indicating consumer 105's authorization of the purchase transaction.

For example, mobile device 165 can display the text "Do you authorize this purchase transaction," and consumer 105 can either select a virtual "Yes" button to indicate that consumer 105 authorizes the purchase transaction, or can select a virtual "No" button to indicate that consumer 105 declines the purchase transaction. Mobile device 165 can transmit consumer 105's response to the authorization request (i.e. the consumer authorization information), such as the electronically captured signature or the PIN number of the virtual button selection, to computer system 1506.

When payment object 740 is a proxy card or proxy object, computer system 1506 can cause a display containing, for example, a listing of one or more of the payment accounts associated with the proxy card or proxy object. Display 1300 of FIG. 13 contains an example of such a display. Consumer 105 can indicate a selection of a payment account to use to initiate the payment, and the selection of the payment account can also be an authorization to obtain funds for the purchase from the payment account. When the purchase transaction information includes a display enabling or in some way enables consumer 105 to enter a tip amount, the consumer authorization information can include a tip amount that is authorized by consumer 105. The tip amount can be added to the total amount of the purchase transaction.

In some embodiments, computer system 1506, upon receipt of the consumer authorization information, can transmit the consumer authorization information to financial system 160C. Financial system 160C can use the consumer authorization information, along with other information, to determine whether to authorize the purchase transaction. Financial system 160C, when it determines to authorize the purchase transaction, can transmit a transaction authorization to computer system 150B, and computer system 150B can transmit a similar transaction authorization to sales system 480 thereby completing the purchase transaction. At this point, consumer 105 is free to leave the restaurant, as consumer 105 has paid the bill.

In some embodiments, computer system 150B has already obtained an authorization for the purchase transaction from financial system 160B prior to receipt of the consumer authorization information. Upon receipt of the consumer authorization information, and having already obtained the authorization for the purchase transaction from financial system 160C, computer system 150B can transmit a purchase transaction authorization to sales system 480 thereby completing the purchase transaction. At this point, consumer 105 is free to leave the restaurant, as consumer 105 has paid the bill. In some embodiments, computer system 150B authorizes the purchase transaction, and sends the purchase transaction authorization to sales system 480 thereby completing the purchase transaction.

Payment mechanisms which can be associated with payment object 740 include a credit card, a charge card, an automated teller machine (ATM) card, a debit card, a pre-paid credit card, a pre-paid debit card, a gift card, a stored value card, a fleet card, and a loyalty program, among others.

A loyalty program can be associated with payment object 740, and a loyalty program can be a payment mechanism. For example, a mobile device or the digital wallet of a mobile device or a proxy card or proxy object can be associated with a loyalty program, and the loyalty program can be used to pay for a purchase transaction. A seller may be motivated to incentivize certain behaviors in customers.

For example, the seller may want the consumer to return to the seller's store, or to purchase a certain item, or to return to the store at a certain time or during a certain time window and make a purchase. To incentivize behaviors such as these, a seller can participate in or offer a loyalty program. The seller can provide loyalty points or some equivalent for each purchase made by a consumer. By coming back to the seller's store and making additional purchases, the consumer can grow the consumer's loyalty points. The loyalty points can be redeemed for purchases made at the seller's store or another of the seller's stores or with other businesses that participate in the loyalty program.

In addition to incentivizing loyalty to a store or a brand by providing loyalty points for purchases made at the store or for brand products, a seller can use the loyalty program to incentivize other behaviors. For example, if the store has a slow period, such as a coffee shop is slow between 3 pm and 4 pm, the store owner can, in order to incentivize consumers to make purchases at the store during this slow time, offer increased loyalty points for purchases made between 3 pm and 4 pm at the store. The store owner can also offer increased redemption value for a consumer's loyalty points, or can lower the cost of products or services in terms of loyalty points, during this time window. For example, the store owner could offer to redeem 100 loyalty points and provide 150 points of value, or could reduce an item that normally costs 150 loyalty points to 100 loyalty points, for purchases made between 3 pm and 4 pm. As another example, if a business owner wants to incentivize consumers to purchase a new item the business owner is introducing, the business owner can offer increased loyalty points to consumers for purchasing this new item. The business owner can also offer increased loyalty point redemption value or reduced loyalty point costs to a consumer for purchasing this new item using loyalty program points. For example, if the new item can be normally purchased with 150 loyalty points, the business owner can offer 150 points of loyalty program value for 100 redeemed loyalty points to a consumer for purchasing this new item, or the business owner can reduce the cost of the new item to 100 loyalty points.

FIG. 9 is a flow chart illustrating exemplary operations of a second embodiment of a method for authorizing a transaction using a mobile device. The following description of FIG. 9 will be described using the embodiment of FIG. 7, and will refer to labels of that figure. This is a non-limiting example and is done with the intent of making the description of FIG. 9 easier to understand.

Step 905 includes establishing a communications channel with a sales system. Using the example of FIG. 7, sales system 480, which can be associated with a seller, merchant, or payee, and computer system 150 can establish a communication channel to facilitate communication between each other (i.e. between sales system 480 and computer system 150). For example, computer system 150 can establish a communications channel with sales system 480. The communications channel can be via any network or other medium that supports communication between computer system 150 and sales system 480, and it can be via one or more intermediary computer systems, such as the computer system or systems that comprise financial system 160A.

Where the communications channel is via an intermediary computer system, the intermediary computer system can forward messages/data transmitted by sales system 480 to computer system 150 and can forward messages/data transmitted by computer system 150 to sales system 480. Further, the intermediary computer system, while transmitting messages/data as part of the communications channel, can process the message/data transmitted by sales system 480 and computer system 150, and can change, transform, or replace the message/data before transmitting the message/data. Messages/data transmitted by sales system 480 do not need to be addressed to computer system 150. For example, sales system 480 can send a message or data addressed to financial system 160A. Financial system 160A can determine that the message/data should be transmitted to computer system 150, and can forward that message/data to computer system 150. Further, financial system 160A can process the message/data, changing, transforming, or replacing the message/data, and can transmit the processed message/data to computer system 150 as part of the communications channel. The communications channel can work similarly in the opposite direction (i.e. from computer system 150 to sales system 480).

The communications channel can be established using any communication medium or mediums supported by sales system 480 and computer system 150. For example, the communications channel can be established using an internet protocol network (i.e., a network that supports the TCP/IP protocol), a network that includes third generation telecommunications (i.e. 3G), a network that includes fourth generation telecommunications (i.e. 4G), a network that includes WiFi (i.e. IEEE 802.11b), and a network that includes Bluetooth, among others. Once the communications channel is established, messages/data transmitted by sales system 480 can be received by computer system 150, and messages/data transmitted by computer system 150 can be received by sales system 480. As previously discussed, the received messages/data can be processed by an intermediary computer system or systems.

Step 910 includes receiving transaction information associated with a purchase transaction. Using the example of FIG. 7, consumer 105 can make a purchase, which can be rung up by a cashier (or by consumer 105, when the sales system is a self-serve sales system), the purchase being part of a purchase transaction. Sales system 480 can transmit information associated with the purchase transaction (i.e. transaction information), such as the total amount of the purchase transaction or a list of line items of the purchase transaction or identifying information for the seller/merchant/payee using sales system 480 to process the payment. The transmitted transaction information can be addressed to computer system 150, or can be addressed to financial system 160A, or can be addressed to another other computer system. Computer system 150A can receive, from sales system 480, the transaction information associated with the purchase transaction, as per step 910. Sales system 480 can transmit the transaction information addressed to computer system 150, or can transmit the transaction information to an intermediary computer system or systems, which can process the transaction information and transmit the transaction information to computer system 150.

Step 915 includes receiving identity information associated with a payment object. The payment object was used to pay for the purchase transaction. Using the example of FIG. 7, the payment object can be payment object 740. For example, payment object 740 can be a credit card. Consumer 105 can use the credit card to pay for the purchase transaction, and credit card information associated with the credit card (i.e. payment object information associated with payment object 740), including identity information, can be obtained by sales system 480 by, for example, swiping the credit card using a card reader that is part of sales system 480. Sales system 480 can transmit the identity information, which is part of the payment object information, along with other information such as the transaction information. Computer system 150 can receive the identity information that is associated with the credit card (i.e. that is associated with payment object 740), as per step 915, and the other information as well. The transaction information can include, for example, an amount of the purchase transaction, a listing of line items associated with the purchase transaction, a display enabling consumer 105 to enter or select a tip amount for the purchase transaction, or any other method of enabling consumer 105 to enter or select a tip amount for the purchase transaction, among other information.

Step 920 includes determining information for a mobile device associated with the payment object. Using the example of FIG. 7, computer system 150 can have access to a database that associates payment objects with mobile devices. The database can be local to computer system 150, or can be stored on a remote computer system and computer system 150 can access the database stored on the remote computer system. In some embodiments where computer system 150 has access to the database, computer system 150 can perform a database operation to determine information, for example contact information such as an IP address or a phone number, of a mobile device associated with a payment object. For example, computer system 150 can perform a database lookup using the identifying information for the payment object, and the database lookup can return identifying information for mobile device 165. In some embodiments, computer system 150 can communicate with an alternative computer system that can provide information regarding a mobile device that is associated with a payment object. In these embodiments, computer system 150 can determine information associated with a mobile device associated with the payment object by transmitting information related to the payment object, such as identifying information for a credit card, to the alternative computer system, and the alternative computer system can respond with information regarding a mobile device that is associated with the payment object, such as identifying information or contact information for a mobile device that is associated with the credit card.

Step 925 includes causing an authorization request to be transmitted to the mobile device. Using the example of FIG. 7, computer system 150 can cause an authorization request, to authorize the purchase transaction, to be transmitted to mobile device 165. In some embodiments, computer system 150 can transmit machine readable code to mobile device 165, and the machine readable code, when received by mobile device 165, can cause a request to authorize the purchase transaction to be displayed on mobile device 165. For example, mobile device 165 can display a request to authorize a purchase transaction that would appear similar to the illustration of FIG. 10. In some embodiments, computer system 150 can transmit a message to an alternative computer system, and the alternative computer system can transmit an authorization request to authorize the purchase transaction to mobile device 165. For example, computer system 150 can transmit a message to sales system 480, and sales system 480 can transmit an authorization request to authorize the purchase transaction to mobile device 165. The transmission from sales system 480 to mobile device 165 can be via any medium supported by both devices. For example, the transmission can be via Bluetooth, WiFi, 3G, 4G, or any other available medium.

When the payment object is a proxy card or proxy object, computer system 150 can cause a display containing, for example, a listing of one or more of the payment accounts associated with the proxy card or proxy object. Display 1300 of FIG. 13 contains an example of such a display. Consumer 105 can indicate a selection of a payment account to use to initiate the payment, and the selection of the payment account can also be an authorization to obtain funds for the purchase from the payment account.

Further, the authorization request can include a display or some other mechanism enabling consumer 105 to select or enter a tip amount. For example, the display or other mechanism can present several tip options to consumer 105, and consumer 105 can select a tip amount from amongst these tip options. As a second example, the display may have a tip amount field, and the consumer can enter any monetary amount in this field. The tip amount can be added to the purchase transaction, and the total amount of the purchase transaction can include the tip amount. Additionally, the authorization request can include other information related to the purchase transaction. For example, the authorization request can include a listing of line items of the purchase transaction. One example of a display that includes a listing of line items of a purchase transaction is the illustration of FIG. 10, where the line items "Vanilla Spice Latte," "Peach Muffin," and "Chocolate Cookie" are displayed.

Step 930 includes causing a listing of the line items of the purchase transaction to be displayed at the mobile device. Using the example of FIG. 7, computer system 150 can cause, when the authorization request includes a listing of line items from the purchase transaction, at least one of the line items of the purchase transaction to be displayed at mobile device 165. In some embodiments, computer system 150 can transmit, as part of transmitting the authorization request, machine readable code to mobile device 165. The machine readable code, when received by mobile device 165, can cause line items of the purchase transaction to be displayed on mobile device 165. For example, mobile device 165 can display a listing of line items of the authorize a purchase transaction that would appear similar to the illustration of FIG. 10, where the line items "Vanilla Spice Latte," "Peach Muffin," and "Chocolate Cookie" are displayed. In some embodiments, when the authorization request includes a listing of line items from the purchase transaction, none of the line items from the purchase transaction are displayed on the mobile device.

In some embodiments, computer system 150 can transmit a message to an alternative computer system, and the alternative computer system can transmit a machine readable code to mobile device 165. The machine readable code, when received by mobile device 165, can cause line items of the purchase transaction to be displayed on mobile device 165. For example, computer system 150 can transmit a message to sales system 480, and sales system 480 can transmit a message to mobile device 165. The message, when received by mobile device 165, can cause a listing of line items of the purchase transaction to be displayed on mobile device 165. The transmission from sales system 480 to mobile device 165 can be via any medium supported by both devices. For example, the transmission can be via Bluetooth, WiFi, 3G, 4G, or any other available medium.

Step 935 includes receiving a response to the authorization request including response information. Using the example of FIG. 7, mobile device 165 can send a response to the authorization request, and computer system 150 can receive, from mobile device 165, the response to the authorization request. The response to the authorization request can be addressed to computer system 150, or can be addressed to an intermediary system, and the intermediary system can receive the response to the authorization request transmit to the authorization request to computer system 150. Further, the intermediary computer system can change, transform, or replace the response to the authorization request before transmitting the response to the authorization request to computer system 150. For example, consumer 105 can click a virtual button on mobile device 165 to authorize a purchase transaction. Mobile device 165 can send the (X,Y) coordinate of the click to an intermediary computer system, the (X,Y) coordinate being response information. The intermediary computer system, understanding that the (X,Y) coordinate indicates that the virtual button authorizing the purchase transaction, can transmit a message to computer system 150, not with the (X,Y) coordinate, but rather with an indication that consumer 105 accepted the purchase transaction. The response information can include other information, such as a tip amount for the purchase transaction or an indication of a selection of a payment account to use to initiate the payment.

Step 940 includes sending the response information to a financial system. Using the example of FIG. 7, financial system 160A can transmit a message authorizing the purchase transaction to sales system 480. Therefore, financial system 160A is configured to transmit a message authorizing the purchase transaction to sales system 480. Computer system 150 can transmit at least part of the response information to financial system 160A. For example, computer system 150 can transmit response information such as an indication that consumer 105 accepted the purchase transaction, or a tip amount, or a total amount of the purchase transaction including a tip amount, or an indication of a selected payment account, to financial system 160A. Accordingly, computer system 150 can transmit at least part of the response information to financial system 160A, as per step 940.

Figure 11:
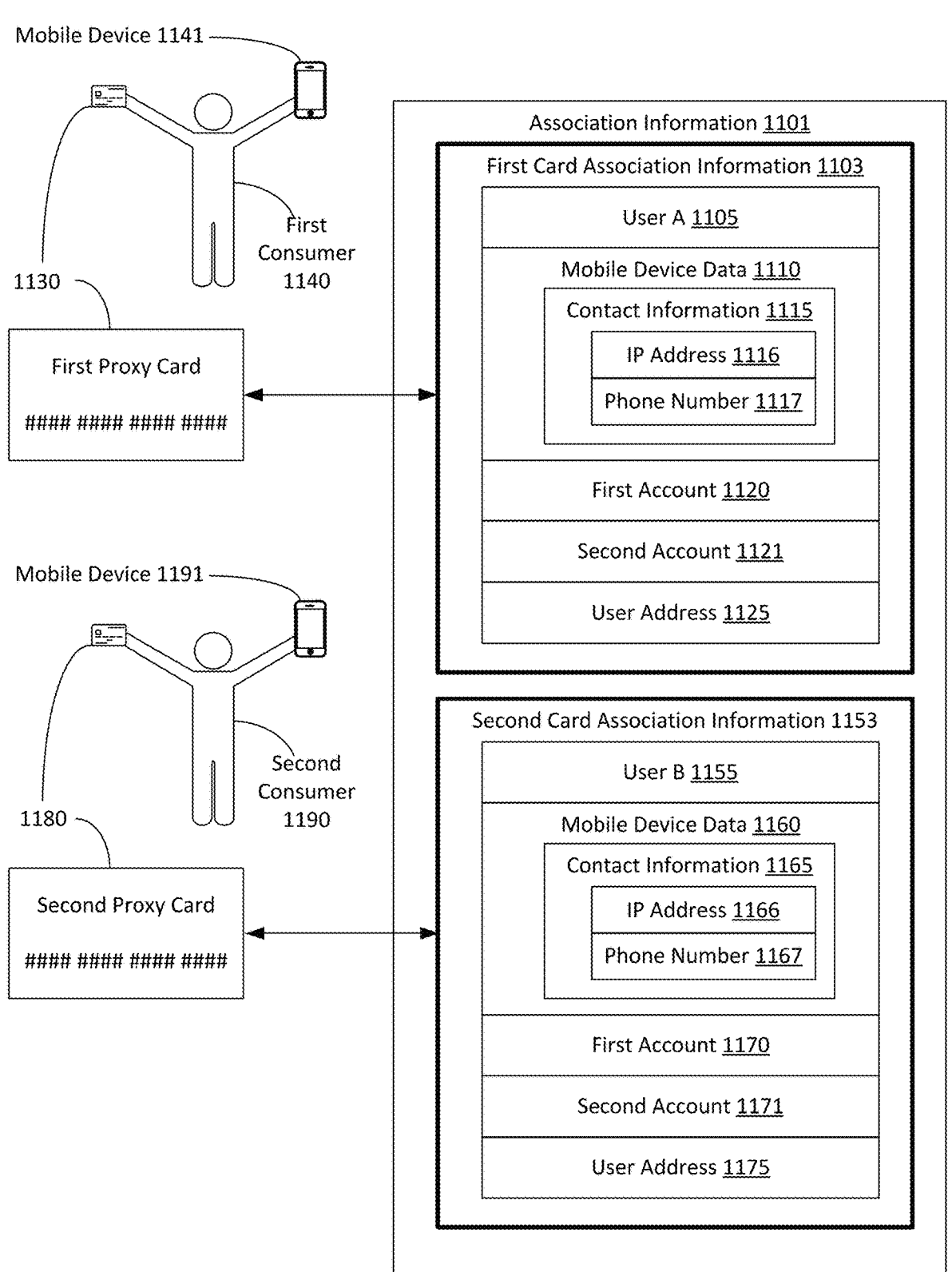
FIG. 11 is an illustration of an association between a proxy card and association information.

FIG. 11 is an illustration of an example of proxy cards being associated with association information. First consumer 1140 and second consumer 1190 each have a proxy card, first consumer 1140 having first proxy card 1130, and second consumer 1190 having second proxy card 1180. In an embodiment, a proxy card is a card associated with multiple electronic accounts where the association is maintained by a server. The proxy card can also be associated with additional data. First consumer 1140 and second consumer 1190 each have a mobile device, first consumer 1140 having mobile device 1141, and second consumer 1190 having mobile device 1191. Proxy cards 1130 and 1180 are each associated with association information 1101, which includes first card association information 1103 and second card association information 1153.

First proxy card 1130 is associated with first card association information 1103, which includes user A 1105, mobile device data 1110, first account 1120, second account 1121, and user address 1125. User A is a representation of first consumer 1140 and can be the consumer's account, the name of the consumer, an identifying indicator of the consumer such as a social security number, a driver's license number, or a number or character string that is unique and is associated with the consumer, among other things. Mobile device data 1110 is a representation of data associated with a mobile device of the consumer, in this case mobile device 1141 of first consumer 1140. Mobile device data 1110 includes contact information 1115, which is information as to how to contact mobile device 1141.

A mobile device can be contacted, for example, by an internet protocol (IP) message, a text message, an email message, among other methods of contact. Contact information 1115 includes IP address 1116 and phone number 1117. When an IP message is sent, IP address 1116 can be used to send the message to mobile device 1141. When a text message is sent, phone number 1117 can be used to send the text message to mobile device 1141. When an email message is sent, an email address (not shown), which can be associated with contact information 1115, can be used to send the email message to mobile device 1141. First account 1120 and second account 1121 are electronic accounts that are associated with first proxy card 1130. User address 1125 is the mailing address of first consumer 1140.

Second proxy card 1180 is associated with second card association information 1153, which includes user B 1155, mobile device data 1160, first account 1170, second account 1171, and user address 1175. User B is a representation of second consumer 1190 and can be the consumer's account, the name of the consumer, an identifying indicator of the consumer such as a social security number, a driver's license number, or a number or character string that is unique and is associated with the consumer, among other things. Mobile device data 1160 is a representation of data associated with a mobile device of the consumer, in this case mobile device 1191 of second consumer 1190. Mobile device data 1160 includes contact information 1165, which is information as to how to contact mobile device 1191.

A mobile device can be contacted, for example, by an internet protocol (IP) message, a text message, an email message, among other methods of contact. Contact information 1165 includes IP address 1166 and phone number 1167. When an IP message is sent, IP address 1166 can be used to send the message to mobile device 1191. When a text message is sent, phone number 1167 can be used to send the text message to mobile device 1191. When an email message is sent, an email address (not shown), which can be associated with contact information 1165, can be used to send the email message to mobile device 1191. First account 1170 and second account 1171 are electronic accounts that are associated with second proxy card 1180. User address 1175 is the mailing address of second consumer 1190.

In various embodiments, the association information is generated in various ways. To generate first card association information 1103, first consumer 1140 can use a website to create a login account, information for which can be at user A 1105. First consumer 1140 can enter various information related to mobile device 1141 using the website, and that information can comprise mobile device data 1110. First consumer 1140 can enter information for various electronic accounts using the website, and the electronic accounts can be added to first card association information 1103, such as at first account 1120 and second account 1121. First consumer 1140 can enter his mailing address using the website, and this information can be added to first card association information 1103, such as at user address 1125. Alternately, first consumer 1140 can send a text message or an email to cause first card association information 1103 to be generated, or any portion of first card association information 1103 to be generated. For example, first consumer 1140 can create a login account using the website. First consumer 1140 can send a text message to create mobile device data 1110, or can run an application on mobile device 1141, which can send information obtained from mobile device 1141 to cause part or all of first card association information 1103 to be generated. A person of ordinary skill will appreciate that there are many ways to cause the association information to be generated.

In various embodiments, the electronic accounts associated with a proxy card are electronic accounts associated with credit cards, debit cards, charge cards, automated teller machine (ATM) cards, pre-paid credit cards, pre-paid debit cards, pre-paid gift cards, stored value cards, fleet cards, gift cards, library cards, loyalty cards, identification cards, among others. In various embodiments, a proxy card can be a magnetic stripe card, a smart card, a proximity card, a re-programmable magnetic stripe card, a card or device containing a quick response (QR) code, or a card containing a bar code. In some embodiments, a proxy object can be used in place of a proxy card. The proxy object can be, among other objects, a mobile device, such as a tablet computer, a smartphone, a laptop computer, a wearable device, or a portable media device, or can be a biometrically identifiable object, such as a finger, a hand, an iris, a retina, or a face.

In various embodiments, association information 1101 can contain other information, such as additional electronic accounts, data for additional mobile devices, data for additional users of a proxy card, such as the spouse or other relative of a consumer who had a proxy card, or business associates of a consumer who has a proxy card. In various embodiments, association information 1101 can include less information. In various embodiments association information 1101 is stored in a database, a data structure, a file, or any combination of one or more of a database, a data structure, or a file. In various embodiments, the association information can be organized hierarchically, including multiple levels of hierarchy, or can have a flat organization. A person of ordinary skill in the art will appreciate that the association information can be stored in various ways using various mechanisms and organizations.

Figure 12:
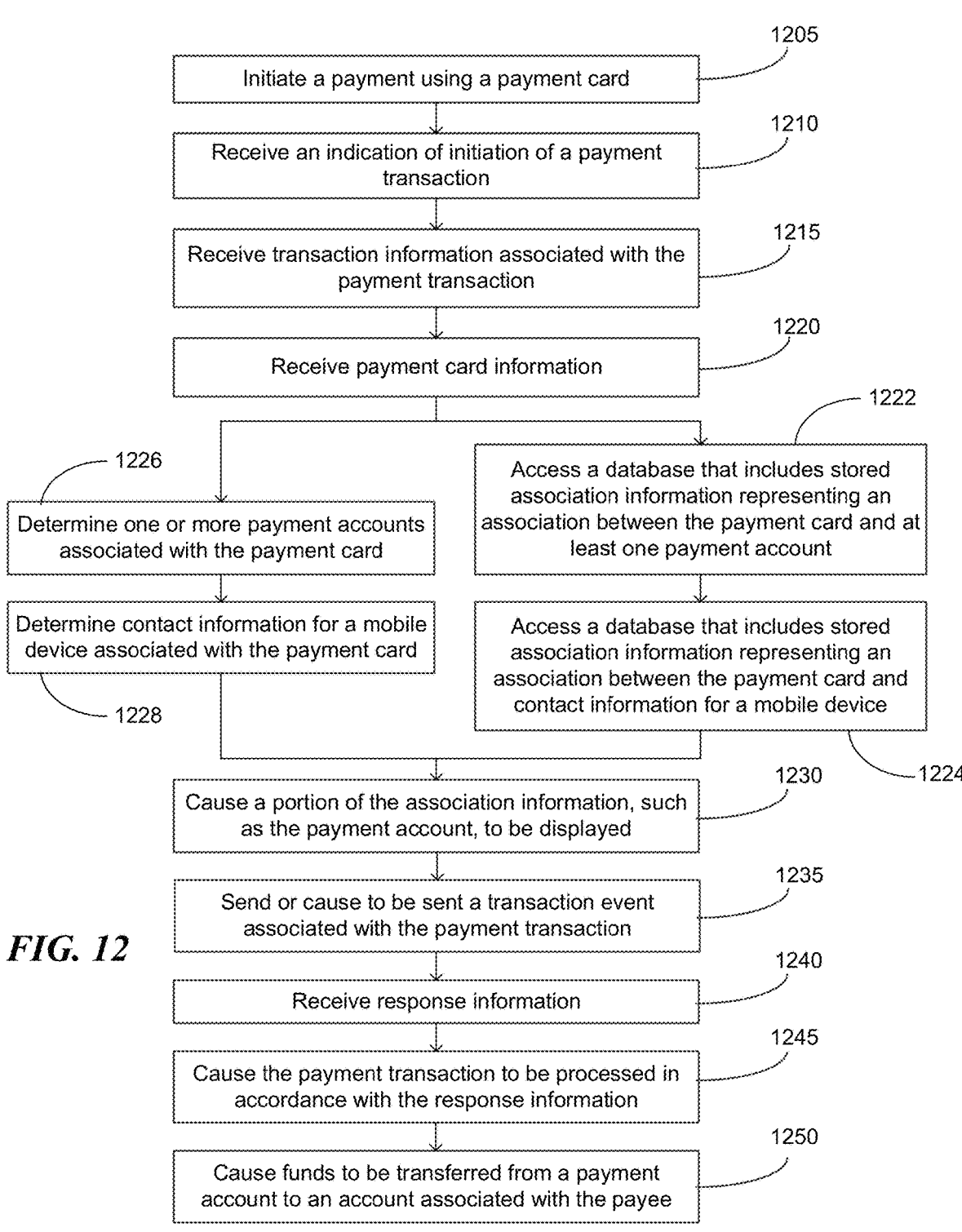
FIG. 12 is a flow chart illustrating exemplary operations of a third embodiment of a method for authorizing a pay-ment transaction using a mobile device.

FIG. 12 is a flow chart illustrating exemplary operations of a third embodiment of a method for authorizing a payment transaction using a mobile device. Step 1205 includes initiating a payment using a payment card. The payment card can be, for example, a proxy card, and the following discussion of FIG. 12 will use a proxy card as the payment card. A consumer can present the proxy card to make a payment associated with a financial transaction. For example, the consumer can purchase a coffee from a merchant. To pay for the coffee, the consumer can present the proxy card to the merchant. The payment can be initiated based on the proxy card being used to initiate a payment to the merchant by swiping the proxy card using a card reader, an optical scanner, etc. associated with and/or coupled to the merchant's payment terminal system, for example a POS system.

Step 1210 includes receiving an indication of initiation of a payment transaction. Step 1210 can occur after step 1205. A computer system, such as computer system 150 of FIG. 1, receives an indication of a payment transaction. The indication of the payment transaction can be the receipt of transaction information for the payment transaction, the receipt of identifying information for the proxy card, the receipt of a request to authorize a transaction, etc.

Step 1215 includes receiving transaction information associated with a financial transaction. Step 1215 can occur after step 1205 or before or after step 1210. The merchant's payment terminal system sends transaction information, such as the amount of the payment, a listing of items associated with the payment, or identifying information for the merchant, to a financial system, such as financial system 160A of FIG. 1. The transaction information is sent partly to obtain authorization for a payment made in association with a financial transaction. Financial system 160A relays the transaction information to a computer system, such as computer system 150, where it is accordingly received.

Step 1220 includes receiving payment card information. Step 1220 can occur after steps 1205 or 1210, or before or after step 1215. The merchant's payment terminal system sends identifying information for the proxy card, such as the information obtained during the swipe of the proxy card, to a financial system, such as financial system 160A. The identifying information is sent partly to obtain authorization for a payment made in association with a financial transaction. Financial system 160A relays the identifying information to a computer system, such as computer system 150, where it is accordingly received.

Step 1222 includes accessing a database that includes stored association information representing an association between the payment card and at least one payment account. Step 1222 can occur after steps 1205-1220. A computer system, such as computer system 150, can access the database. The association information can be, for example, association information 1101 of FIG. 11, and includes information related to accounts associated with the proxy card. The database can be accessed for many reasons. For example, the computer system can access the database to determine one or more of the payment accounts that are associated with the proxy card, such as first account 1120 and/or second account 1121, or can access the database to obtain an address for the holder of the proxy card, such as user address 1125.

Step 1224 includes accessing a database that includes stored association information representing an association between the payment card and contact information for a mobile device. Step 1224 can occur after steps 1205-1220, and before or after step 1222. A computer system, such as computer system 150, can access the database. The association information can be, for example, association information 1101 of FIG. 11, and includes contact information for a mobile device, such as contact information 1115 of FIG. 11 for mobile device 1141. The computer system can access the database to obtain contact information, such as IP address 1116 or phone number 1117, so that communication can be established with the mobile device.

Step 1226 includes determining one or more payment accounts associated with the payment card. Step 1222 can occur after steps 1205-1222. A computer system, such as computer system 150, can determine one or more payment accounts associated with the proxy card. When the payment card is a credit card, the computer system can determine the payment account associated with the credit card. The computer system can make this determination based on the database access of step 1222, or based on identifying information obtained from the payment card during the card swipe, or in other ways. For example, the computer system can determine the payment accounts by communicating with a remote computer that is part of a different computer system. The remote computer can, for example, perform a database access to determine one or more payment account associated with the proxy card, and send information related to the payment account(s) to the computer system. When the computer system receives information related to the payment account(s), the computer system has determined the one or more payment accounts associated with the payment card.

Step 1228 includes determining contact information for a mobile device associated with the payment card. Step 1228 can occur after steps 1205-1220 or 1224, and before or after steps 1222 or 1226. A computer system, such as computer system 150, can determine contact information for a mobile device associated with the proxy card. The computer system can make this determination based on the database access of step 1222. For example, when the payment card is a credit card, the computer system can access a database, such as the database of step 1222, that associates identifying information from the credit card and contact information for a mobile device.

Step 1230 includes causing a portion of the association information, such as one or more payment accounts associated with the proxy card, to be displayed. Step 1230 can be after steps 1226 or 1222, and before or after steps 1228 or 1224. A computer system, such as computer system 150, can cause a portion of the association information to be displayed. The computer system causes information related to the one or more payment accounts associated with the proxy card to be displayed on a mobile device, such as mobile device 1141.

Step 1235 includes sending or causing to be sent a transaction event associated with the payment transaction. Step 1235 can be after 1228 or 1224, or before or after 1230. A computer system, such as computer system 150, can send the transaction event or cause the transaction event to be sent to a mobile device, such as mobile device 1141. In an embodiment, the transaction event is to cause the consumer to indicate, using the mobile device, a selection of a payment account of the payment accounts to use in processing the payment transaction. The transaction event can be the sending of a signal/message/text/email/etc. that causes the display of an image related to the transaction at the mobile device. For example, the transaction event can be the sending of a signal/message/text/email/etc. that causes a listing of one or more of the payment accounts associated with the proxy card to be displayed on the mobile device. The listing is associated with the payment transaction in that the consumer can indicate a selection of one of the payment accounts to use to obtain funds for the payment transaction.

In an embodiment, the transaction event is to cause the consumer to indicate, using the mobile device, a tip amount associated with the payment transaction. The transaction event can be the sending of a signal/message/text/email/etc. that causes the display of an tipping interface, such as the interface of FIG. 10, at the mobile device. The transaction event is associated with the payment transaction, in that it causes the tip amount associated with the payment transaction to be indicated. In an embodiment, the transaction even is to cause the consumer to provide, using the mobile device, an electronic signature. The electronic signature can be to indicate that the consumer agrees to the terms of the payment transaction. The transaction event can be the sending of a signal/message/text/email/etc. that causes the display of a signature capturing interface to be displayed at the mobile device. The transaction event is associated with the payment transaction in that the captured electronic signature indicates acceptance of the payment transaction by the consumer.

In an embodiment, the transaction event is to cause the consumer to provide, using the mobile device, at least one of a personal identification number (PIN) of the consumer, a password of the consumer, or a pass phrase of the consumer. The transaction event can be the sending of a signal/message/text/email/etc. that causes the display of an interface to capture the PIN, password, or passphrase. The transaction event is associated with the payment transaction in that the captured PIN, password, or passphrase indicate acceptance of the payment transaction by the consumer.

Step 1240 includes receiving response information. Step 1240 can be after step 1230 or before or after step 1235. A mobile device, such as mobile device 1141, can send the response information, which can be received by a computer system, such as computer system 150. As examples, the response information can include: an indication of a response made by the consumer in response to the transaction event; an indication of a selection of a payment account of the payment accounts to use in processing the payment transaction; an indication of a tip amount associated with the payment transaction; an electronic signature, in some embodiments to indicate that the consumer agrees to the terms of the payment transaction; a PIN; a password; or a passphrase, among others.

Step 1245 includes causing the payment transaction to be processed in accordance with the response information. A computer system, such as computer system 150, causes the payment transaction to be processed in accordance with the response information received at step 1240. When the response information indicates a selection of a payment account of the payment accounts to use in processing the payment transaction, the computer system causes the payment transaction to be processed using the selected payment account. When the response information indicates a tip amount associated with the payment transaction, the computer system causes the processing of the payment transaction to include the tip amount. When the response information includes an electronic signature indicating acceptance of the terms of the purchase transaction, the computer system causes the purchase transaction to be processed in accordance with the acceptance. When the response information includes a PIN, password, or passphrase, the computer system causes the payment transaction to be obtained from the payment account associated with the PIN, password, or passphrase.

Step 1245 includes causing funds to be transferred from a payment account to an account associated with the payee. A computer system, such as computer system 150, causes the funds to be transferred. When the payment card is a proxy card, and one of the associated payment accounts is selected, the computer system causes funds to be transferred from the selected payment account to an account associated with the merchant (i.e. the payee). When the payment card is associated with only one payment account, the computer system causes funds to be transferred from the one payment account to an account associated with the merchant (i.e. the payee).

Figure 14:
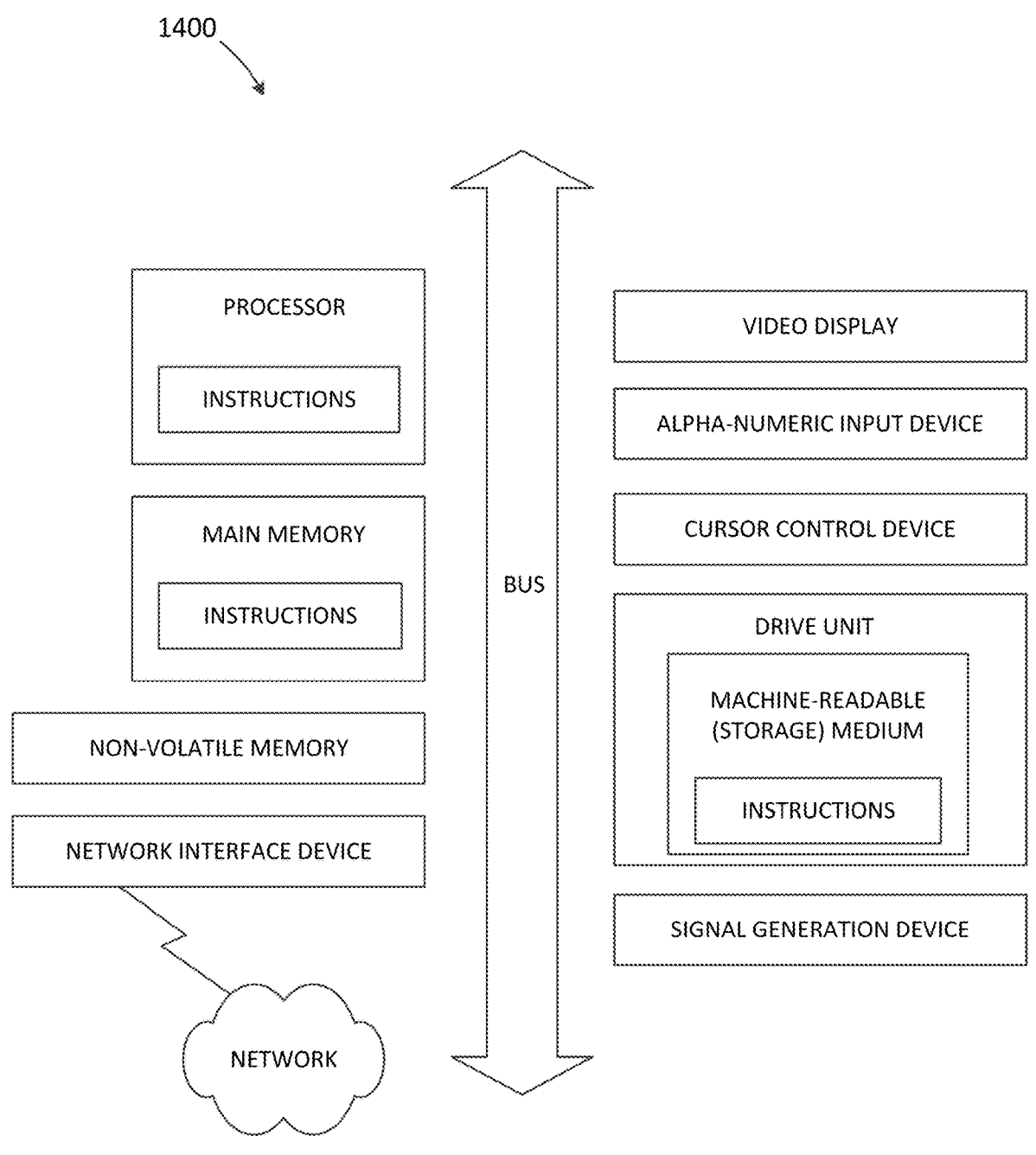
FIG. 14 is a diagrammatic representation of a machine in the example form of a computer system within which a set of instructions, for causing the machine to perform any one or more of the methodologies or modules discussed herein, may be executed.

FIG. 14 is a diagrammatic representation of a machine in the example form of a computer system within which a set of instructions, for causing the machine to perform any one or more of the methodologies or modules discussed herein, may be executed. In the example of FIG. 14, the computer system 1400 includes a processor, memory, non-volatile memory, and an interface device. Various common components (e.g., cache memory) are omitted for illustrative simplicity. The computer system 1400 is intended to illustrate a hardware device on which any of the components depicted in the example of FIGS. 1-13 (and any other components described in this specification) can be implemented. The computer system 1400 can be of any applicable known or convenient type. The components of the computer system 1400 can be coupled together via a bus or through some other known or convenient device.

This disclosure contemplates the computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1400 may include one or more computer systems 1400; be unitary or distributed; span multiple locations; span multiple machines; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

The processor may be, for example, a conventional microprocessor such as an Intel Core microprocessor or an Intel Itanium microprocessor or a Motorola power PC microprocessor or a SPARC architecture processor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) or static RAM (SRAM). The memory can be local, remote, or distributed.

The bus also couples the processor to the non-volatile memory and drive unit. The non-volatile memory cane be a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of storage for large amounts of data. Some of this data is often written, by a direct memory access process, into memory during execution of software in the computer 1400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, storing the entire program in memory may not even be possible. Nevertheless, one should understand that for software to run, if necessary, the software is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. A person of ordinary skill will appreciate that a modem or network interface can be considered to be part of the computer system 1400. The interface can include an analog modem, ISDN modem, cable modem, token ring interface, satellite transmission interface (e.g. "direct PC"), Wi-Fi interface, or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, this disclosure assumes that controllers of any devices not depicted in the example of FIG. 14 reside in the interface.

The computer system can have one Bus or multiple Buses. A bus can include for example, a system bus, a Peripheral Component Interconnect (PCI) bus or PCI-Express bus, a HyperTransport or industry standard architecture (ISA) bus, a small computer system interface (SCSI) bus, a universal serial bus (USB, USB 2.0, USB 3.0), IIC (I2C) bus, an Institute of Electrical and Electronics Engineers (IEEE) standard 1394 bus, also called "Firewire," a QuickPath Interconnect bus, a ThunderBolt interconnect bus, a DisplayPort interconnect bus or its companion standards Mini DisplayPort (mDP), Direct Drive Monitor (DDM), Embedded DisplayPort (eDP), Internal DisplayPort (iDP), Portable Digital Media Interface (PDMI), Wireless DisplayPort (wDP), and Mobility DisplayPort (MyDP), an HDMI interconnect bus, a DVI bus.

In operation, the computer system 1400 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. Referring to these signals as bits, values, elements, symbols, characters, terms, numbers, or the like has proven convenient at times, principally for reasons of common usage.

One should bear in mind, however, that all of these and similar terms are to be associated with the appropriate physical quantities and are merely convenient labels applied to these quantities. Unless specifically stated otherwise as apparent from the following discussion, one should appreciate that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or constructing more specialized apparatus to perform the methods of some embodiments may prove more convenient. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a laptop computer, a tablet, a set-top box (STB), a personal digital assistant (PDA), a cellular telephone, an iPhone, a Blackberry, a smartphone, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), Blu-ray disks, among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

A person having ordinary skill in the art will appreciate that there are various other ways to implement the described functionality. The scope of this disclosure also includes embodiments implementing the described functionality in these various other ways. Accordingly, the scope of the present disclosure is intended to embrace all such alternatives, modifications, and variations as fall within the scope of the claims, together with all equivalents thereof.

Numerous specific details are set forth in order to provide a thorough understanding of embodiments of the present invention. One skilled in the art will appreciate that embodiments of the present invention may be practiced without some of these specific details. In other instances, well-known structures and devices are shown in block diagram form.

Embodiments of the present invention include various steps. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

What is claimed is:

1. A method comprising:

receiving a request to initiate a payment transaction at a payment terminal of a seller, wherein the request includes a reference to a payment card;

querying, in response to the request and by a computer system, a database for an identifier associated with the payment card, wherein the database includes a plurality of identifiers associated with a plurality of payment cards, and wherein the payment card is associated with a plurality of payment accounts of a user;

transmitting a selection message, by the computer system, to a mobile device based on the identifier, wherein the transmitted selection message triggers an application executing at the mobile device to display a selection interface that:

displays the plurality of payment accounts linked to the payment card used to initiate the payment transaction at the payment terminal of the seller, wherein each of the plurality of payment accounts is associated with a respective interactive element of the selection interface; and enables the user to provide feedback associated with the payment transaction via a feedback interactive element of the selection interface;

receiving, by the computer system and from the application executing at the mobile device, a first interaction with an interactive element of the selection interface that indicates selection of a payment account of the plurality of payment accounts, wherein the selected payment account is authorized for use in the payment transaction;

receiving, by the computer system and from the application executing at the mobile device, a second interaction with the feedback interactive element of the selection interface that indicates the feedback associated with the payment transaction; and facilitating, by the computer system, the payment transaction based on the feedback and the selected payment account.

2. The method of claim 1, wherein the feedback includes a tip amount associated with the payment transaction, and wherein the selection interface further enables the user to select, using the mobile device, the tip amount associated with the payment transaction.

3. The method of claim 1, wherein the feedback includes a tip amount associated with the payment transaction, and the selection interface further enables the user to input the tip amount associated with the payment transaction, the method further comprising causing, based on the feedback, funds corresponding to the tip amount to be obtained based on the selected payment account.

4. The method of claim 1, wherein the selection interface further enables the user to provide, using the mobile device, an electronic signature to indicate that the user agrees to terms of the payment transaction.

5. The method of claim 1, wherein the selection interface further enables the user to provide, using the mobile device, at least one of a personal identification number (PIN), a password, or a pass phrase.

6. The method of claim 1, wherein the selection interface enables the user to input data via one or more of a keyboard, an alpha-numeric input device, a cursor control device, a mouse, a pointing device, a touch-sensitive pad, or a touch-sensitive screen.

7. The method of claim 1, wherein the identifier includes one or more of an internet protocol (IP) address associated with the mobile device or a phone number associated with the mobile device.

8. A system comprising:

a processor;

a storage device communicatively coupled to the processor; and

a memory communicatively coupled to the processor, the memory storing instructions that, when executed by the processor, cause the system to perform operations comprising:

receiving a request to initiate a payment transaction at a payment terminal of a seller, wherein the request includes a reference to a payment card;

querying, in response to the request, the storage device, for an identifier associated with the payment card, wherein the storage device the payment card being linked in the storage device to a plurality of payment accounts of a user;

transmitting a selection message to a mobile device based on the identifier, wherein the transmitted selection message triggers an application executing at the mobile device to display selection interface that:

displays the plurality of payment accounts associated with the payment card, wherein each of the plurality of payment accounts is associated with a respective interactive element of the selection interface; and enables the user to provide feedback associated with the payment transaction via a feedback interactive element of the selection interface;

receiving, from the mobile device, a first interaction with an interactive element of the selection interface that indicates selection of a payment account of the plurality of payment accounts, wherein the selected payment account is authorized for use in the payment transaction;

receiving, from the mobile device, a second interaction with the feedback interactive element of the selection interface that indicates the feedback associated with the payment transaction; and facilitating the payment transaction based on the feedback and the selected payment account.

9. The system of claim 8, the operations further comprising:

accessing a database at the storage device to obtain account information for the selected payment account; and transmitting the account information to a financial system to obtain a transaction authorization for the payment transaction, the transaction authorization indicating that the selected payment account has access to adequate funds for a payment amount associated with the payment transaction.

10. The system of claim 8, wherein the selection interface further enables the user to provide, using the mobile device, an electronic signature to indicate that the user agrees to terms of the payment transaction.

11. The system of claim 10, the operations further comprising:

transmitting the electronic signature for use in resolving a dispute related to the payment transaction.

12. The system of claim 8, wherein the feedback includes a tip amount associated with the payment transaction, and wherein the selection interface further enables the user to indicate, using the mobile device, the tip amount associated with the payment transaction.

13. The system of claim 8, wherein an input device associated with the mobile device executing the application comprises one or more of a keyboard, an alpha-numeric input device, a cursor control device, a mouse, a pointing device, a touch-sensitive pad, or a touch-sensitive screen.

14. The system of claim 8, wherein the identifier includes one or more of an internet protocol (IP) address associated with the mobile device or a phone number associated with the mobile device.

15. A non-transitory computer-readable storage medium of a device comprising instructions stored therein, which when executed by one or more processors, cause the one or more processors to perform operations comprising:

receiving a request to initiate a payment transaction at a payment terminal of a seller, wherein the request includes a reference to a payment card;

querying a database, in response to the request, for an identifier associated with the payment card, wherein the database includes a plurality of identifiers associated with a plurality of payment cards, and wherein the payment card is associated with a plurality of payment accounts of a user;

transmitting a selection message to a mobile device based on the identifier, wherein the transmitted selection message triggers an application executing at the mobile device to display a selection interface that:

displays the plurality of payment accounts linked to the payment card used at the payment terminal of the seller, wherein each of the plurality of payment accounts is associated with a respective interactive element of the selection interface; and enables the user to provide feedback associated with the payment transaction via a feedback interactive element of the selection interface;

receiving, from the application, a first interaction with an interactive element of the selection interface that indicates selection of a payment account of the plurality of payment accounts, wherein the selected payment account is authorized for use in the payment transaction;

receiving, from the application, a second interaction with the feedback interactive element of the selection interface that indicates the feedback associated with the payment transaction; and facilitating the payment transaction based on the feedback and the selected payment account.

16. The non-transitory computer-readable storage medium of claim 15, wherein the selection interface further enables the user to provide, using the mobile device, at least one of an electronic signature to indicate that the user agrees to terms of the payment transaction, a personal identification number (PIN), a password, or a pass phrase.

17. The non-transitory computer-readable storage medium of claim 15, wherein the feedback includes a tip amount associated with the payment transaction, and wherein the selection interface further enables the user to indicate, using the mobile device, the tip amount associated with the payment transaction.

18. The non-transitory computer-readable storage medium of claim 15, wherein the selection interface further enables the user to provide an electronic signature to indicate that the user agrees to terms of the payment transaction, the operations further comprising:

transmitting the electronic signature for use in resolving a dispute related to the payment transaction.

19. The method of claim 1, wherein the feedback includes a tip amount associated with the payment transaction, wherein the feedback interactive element includes a tip interactive element of the selection interface, and wherein receiving, by the computer system and from the application executing at the mobile device, the second interaction with the feedback interactive element of the selection interface further comprises:

receiving, by the computer system and from the application executing at the mobile device, a third interaction with the tip interactive element of the selection interface that indicates the tip amount.

20. The method of claim 19, wherein the tip interactive element of the selection interface includes at least one of:

a text box for the user to enter the tip amount;

a first selectable control for the user to select one of multiple different tip amounts; or a second selectable control for the user to select one of multiple different percentages for the tip amount.

* * * * *